United States Patent
Hamamoto et al.

(10) Patent No.: US 8,204,004 B2
(45) Date of Patent: Jun. 19, 2012

(54) FREQUENCY CHANNEL ASSIGNMENT SYSTEM, BASE STATION, CONTROL STATION, INTER-SYSTEM COMMON CONTROL APPARATUS, FREQUENCY CHANNEL ASSIGNMENT METHOD, AND CONTROL METHOD

(75) Inventors: Kozue Hamamoto, Yokohama (JP); Satoru Fukumoto, Yokosuka (JP); Hitoshi Yoshino, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 1197 days.

(21) Appl. No.: 10/591,244

(22) PCT Filed: Mar. 3, 2005

(86) PCT No.: PCT/JP2005/003591
§ 371 (c)(1), (2), (4) Date: Apr. 13, 2007

(87) PCT Pub. No.: WO2005/086516
PCT Pub. Date: Sep. 15, 2005

(65) Prior Publication Data
US 2007/0287464 A1 Dec. 13, 2007

(30) Foreign Application Priority Data
Mar. 5, 2004 (JP) ................................ 2004-063212

(51) Int. Cl.
*H04W 4/00* (2009.01)
*H04W 72/00* (2009.01)
*H04L 12/28* (2006.01)
(52) U.S. Cl. ......... 370/329; 370/341; 370/431; 455/450
(58) Field of Classification Search ................. 455/447, 455/441, 450; 370/329, 431, 441–442
See application file for complete search history.

(56) References Cited

U.S. PATENT DOCUMENTS
5,805,633 A * 9/1998 Uddenfeldt ................... 375/133
(Continued)

FOREIGN PATENT DOCUMENTS
EP 1 261 225 A2 11/2002
(Continued)

OTHER PUBLICATIONS

IEEE Personal Communicaitons Jun. 1996, Channel Assignment Schemes for Cellular Mobile Telecommunication System by I. Katzela and M. Naghshineh.*

(Continued)

*Primary Examiner* — George Eng
*Assistant Examiner* — Nizar Sivji
(74) *Attorney, Agent, or Firm* — Oblon, Spivak, McClelland, Maier & Neustadt, L.L.P.

(57) ABSTRACT

This invention relates to a frequency channel assignment system which enables adaptive overlapping use of the same frequency band in a plurality of radio communications systems. The frequency channel assignment system includes radio communications systems 1 and 2 which use a common frequency band, and controllers 31 and 141. The controllers 31 and 141 include a system characteristics information management function 317 configured to manage system characteristics information showing characteristics of frequency channels in the radio communications systems 1 and 2, and a frequency channel assignment function 1411 configured to assign frequency channels to each of the radio communications systems 1 and 2, based on the system characteristics information and channel status information showing status of frequency channels, so as to avoid inter-system interference.

28 Claims, 22 Drawing Sheets

U.S. PATENT DOCUMENTS

| | | | | |
|---|---|---|---|---|
| 5,974,324 A | * | 10/1999 | Henson | 455/447 |
| 6,535,742 B1 | | 3/2003 | Jiang et al. | |
| 6,567,665 B1 | * | 5/2003 | Kissee | 455/436 |
| 2002/0122406 A1 | * | 9/2002 | Chillariga et al. | 370/347 |
| 2003/0186694 A1 | * | 10/2003 | Sayers et al. | 455/426.1 |
| 2004/0023658 A1 | * | 2/2004 | Karabinis et al. | 455/447 |

FOREIGN PATENT DOCUMENTS

| | | |
|---|---|---|
| JP | 8-140135 | 5/1996 |
| JP | 11 205848 | 7/1999 |
| JP | 11 252636 | 9/1999 |
| JP | 11 512267 | 10/1999 |
| JP | 2000 68975 | 3/2000 |
| JP | 2001 518766 | 10/2001 |
| JP | 2002 111631 | 4/2002 |
| JP | 2002 186019 | 6/2002 |

OTHER PUBLICATIONS

Office Action issued Aug. 31, 2010, in Japan Patent Application No. 2006-510714 (with English-language Translation).

Supplementary European Search Report issued May 31, 2011, in European Patent Application No. 05719895.4.

* cited by examiner

FIG. 1
(a)
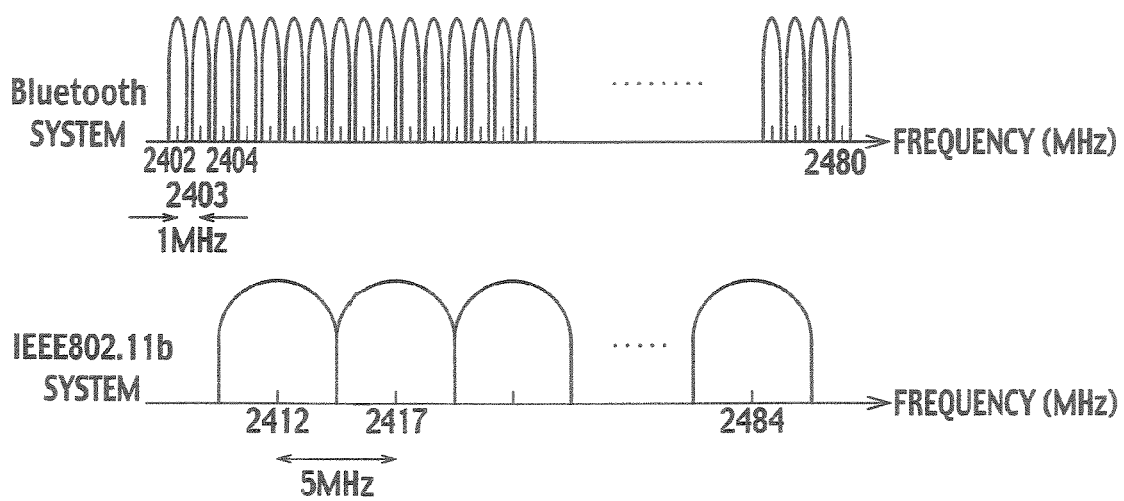
(b)
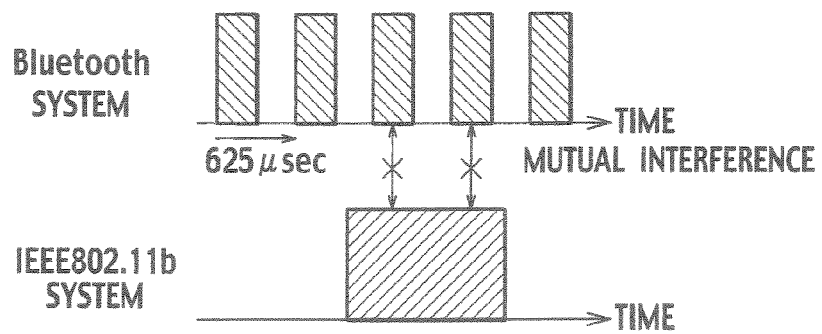

FIG. 2
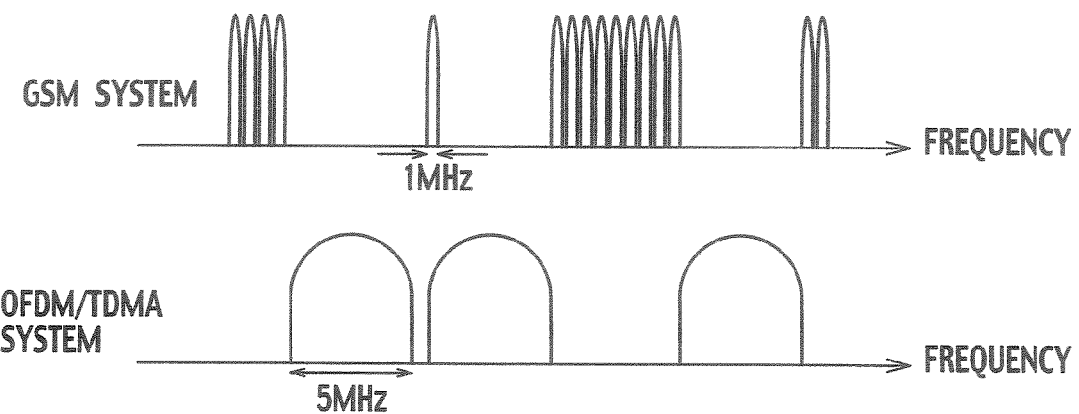
(a)
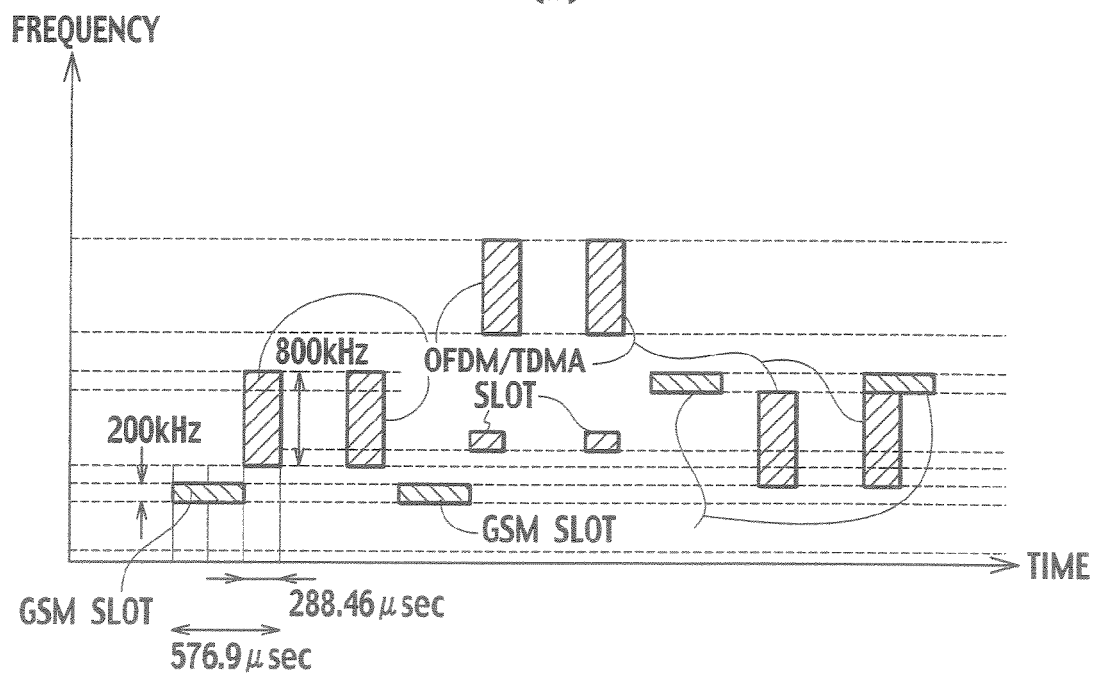
(b)

FIG. 3
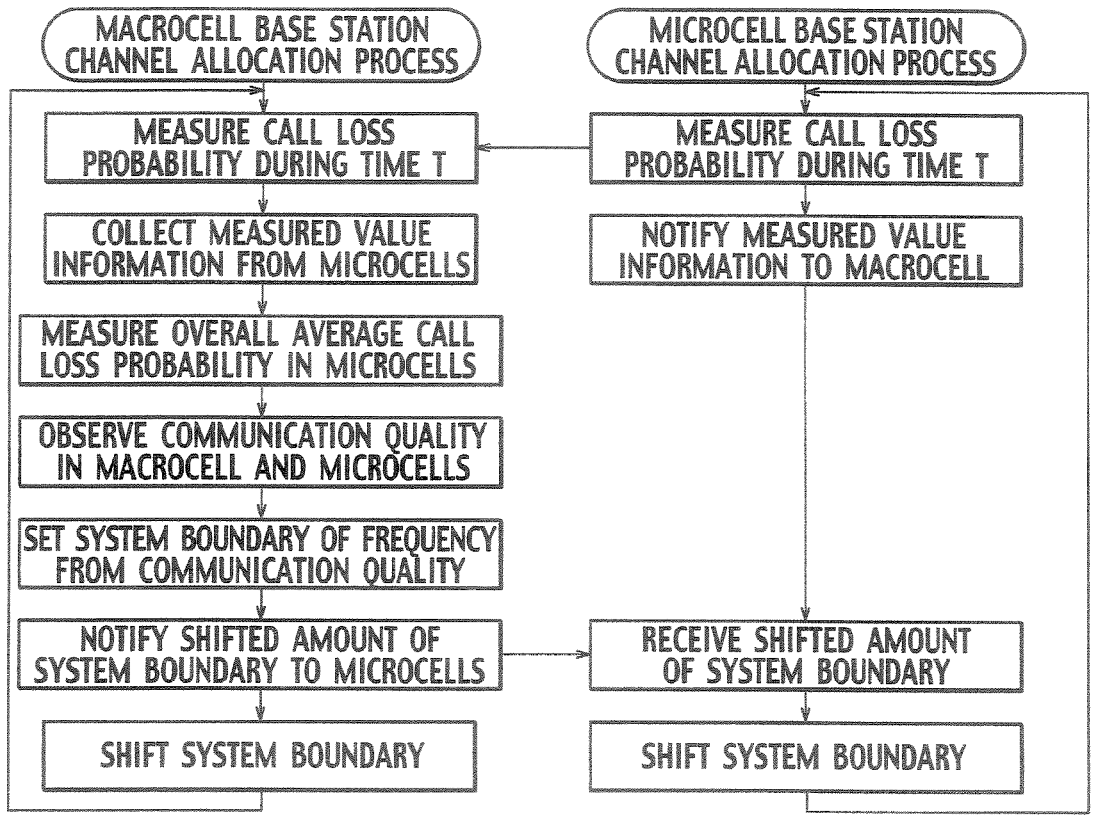
(a)
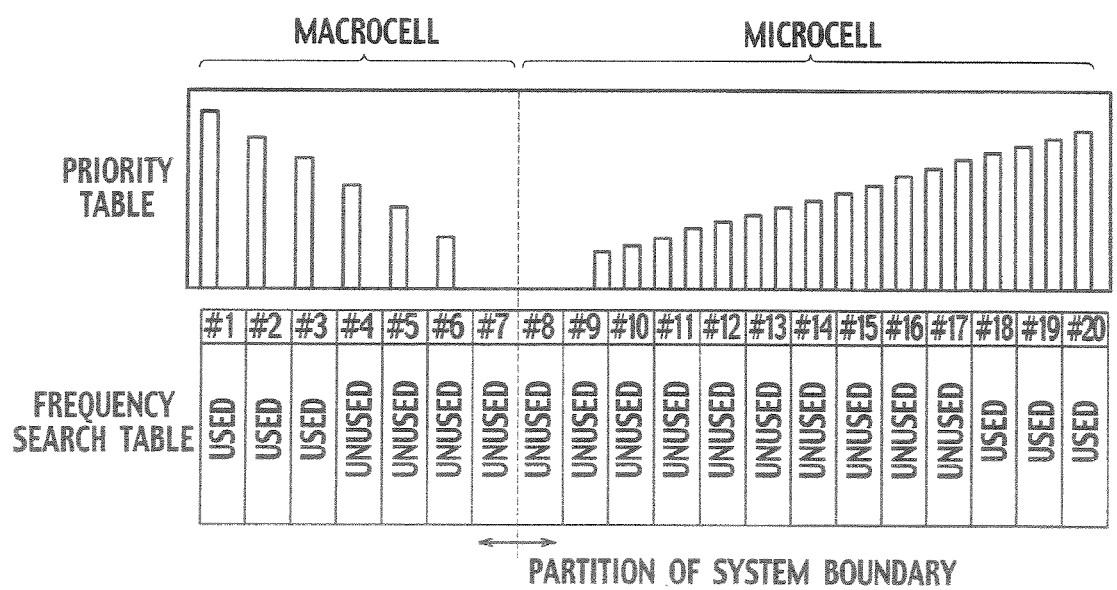
(b)

FIG. 5
(a)
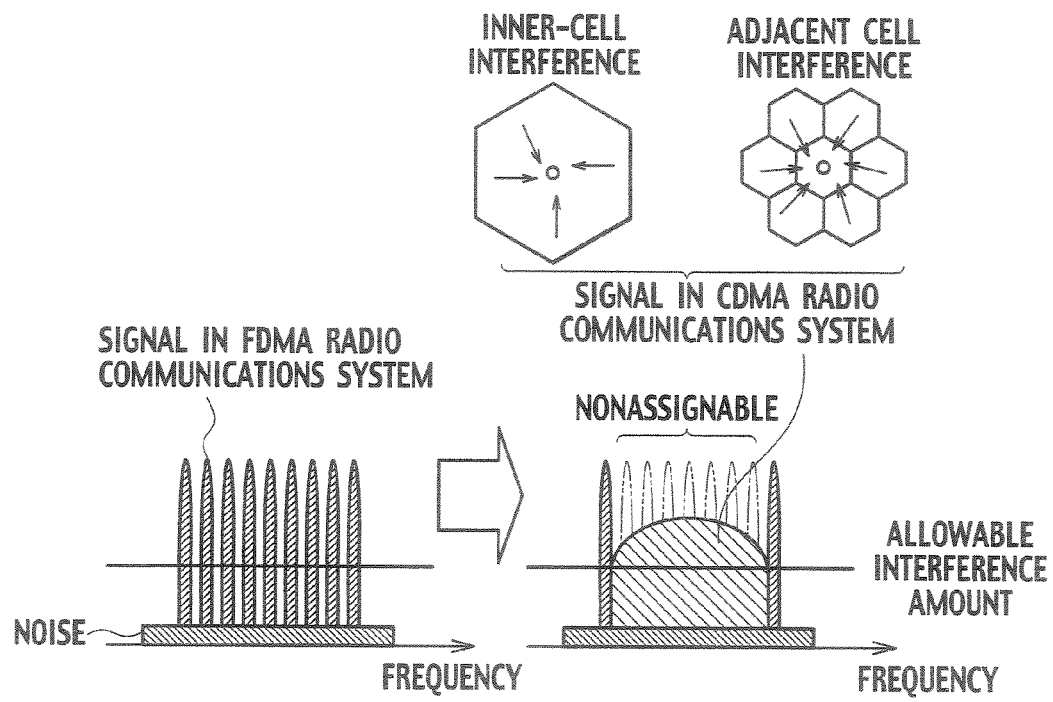
(b)
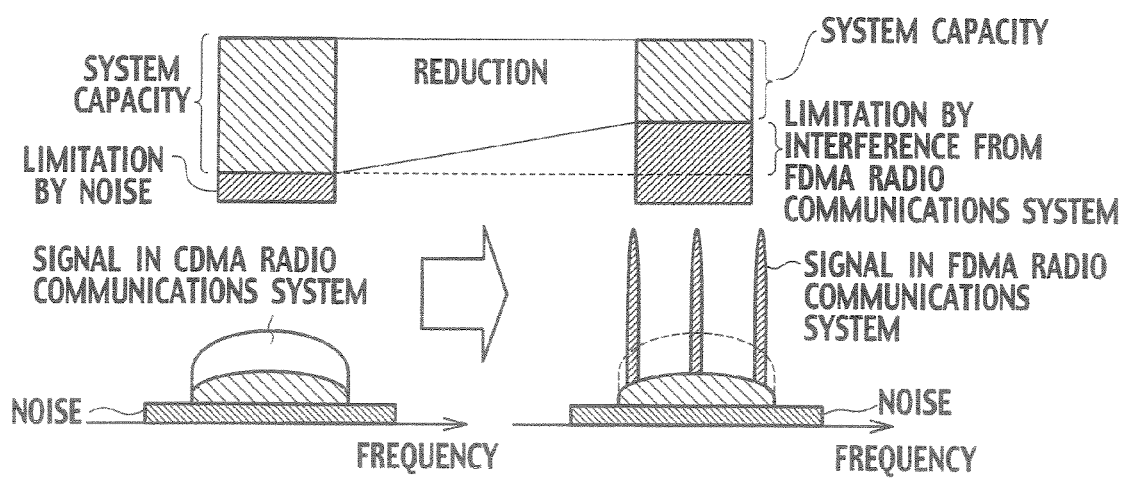

FIG. 6
(a)
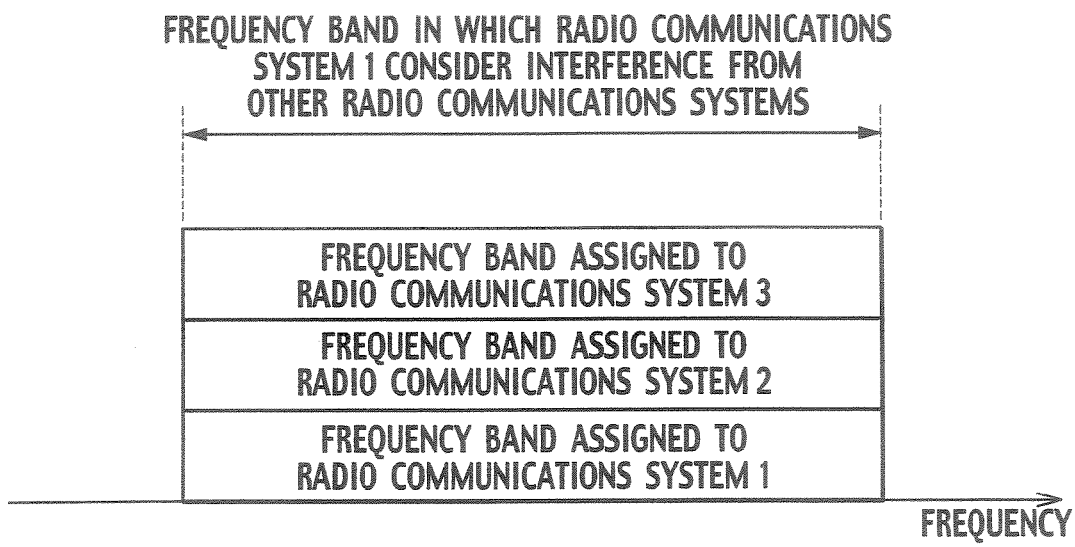
(b)
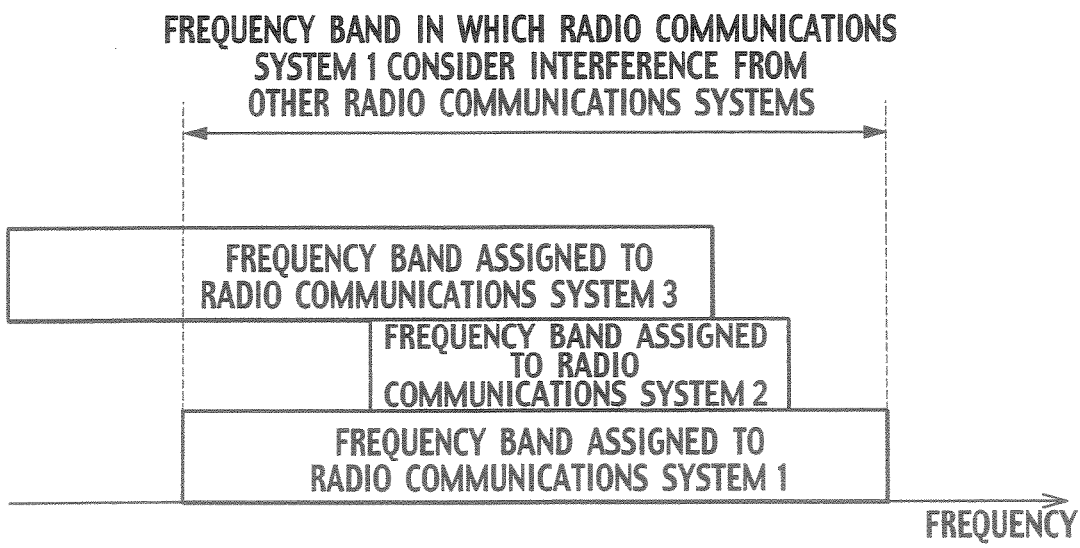

FIG. 11

| CELL | | | | CHANNEL NUMBER | | | | | | | | | |
|---|---|---|---|---|---|---|---|---|---|---|---|---|---|
| RADIO COMMUNICATIONS SYSTEM 2 / CELL 22₁ | RADIO COMMUNICATIONS SYSTEM 1 | CELL 12₁ | | CHANNEL NUMBER | $N_{111}$ | $N_{112}$ | $N_{113}$ | | | $N_{11n}$ | | | |
| | | | | PRIORITY | $P_{111}$ | $P_{112}$ | $P_{113}$ | | | $P_{11n}$ | | | |
| | | | | OCCUPYING USE/ OVERLAPPING USE | OCCUPYING | OCCUPYING | OCCUPYING | | | OVERLAPPING | | | |
| | | | | CHANNEL USE STATUS | UNUSED | USED | UNUSED | | | USED | | | |
| | | | | INTERFERENCE AMOUNT | $I_{111}$ | $I_{112}$ | $I_{113}$ | | | $I_{11n}$ | | | |
| | | | | ALLOWABLE INTERFERENCE AMOUNT | $A_{111}$ | $A_{112}$ | $A_{113}$ | | | $A_{11n}$ | | | |
| | | CELL 12₂ | | CHANNEL NUMBER | $N_{121}$ | $N_{122}$ | $N_{123}$ | | | $N_{1n2}$ | | | |
| CELL 22₂ | | | | PRIORITY | $P_{121}$ | $P_{122}$ | $P_{123}$ | | | $P_{12n}$ | | | |
| | | | | OCCUPYING USE/ OVERLAPPING USE | OCCUPYING | OCCUPYING | OCCUPYING | | | OVERLAPPING | | | |
| | | | | CHANNEL USE STATUS | UNUSED | USED | UNUSED | | | USED | | | |
| | | | | INTERFERENCE AMOUNT | $I_{121}$ | $I_{122}$ | $I_{123}$ | | | $I_{12n}$ | | | |
| | | | | ALLOWABLE INTERFERENCE AMOUNT | $A_{121}$ | $A_{122}$ | $A_{123}$ | | | $A_{12n}$ | | | |

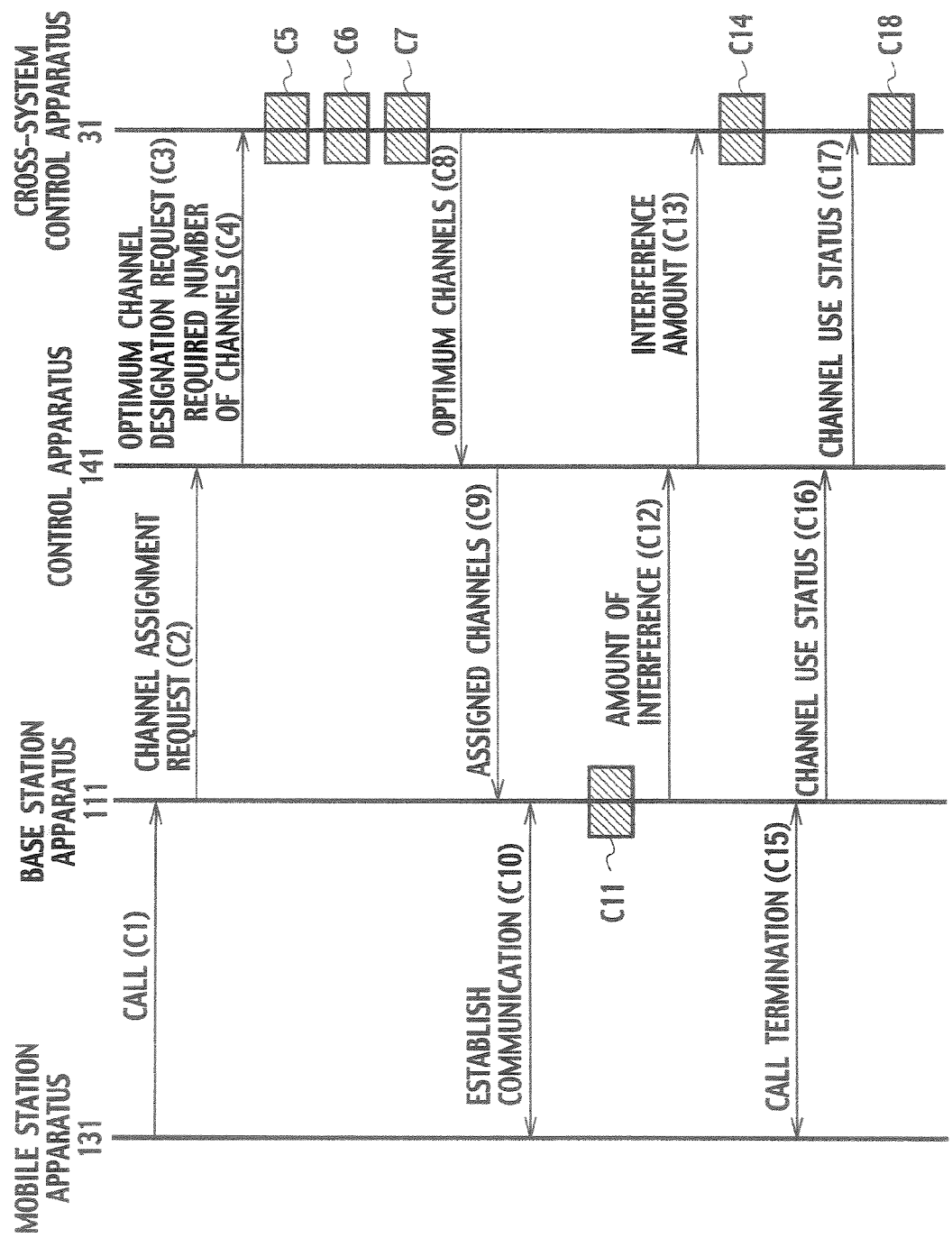

FIG. 16
(a)
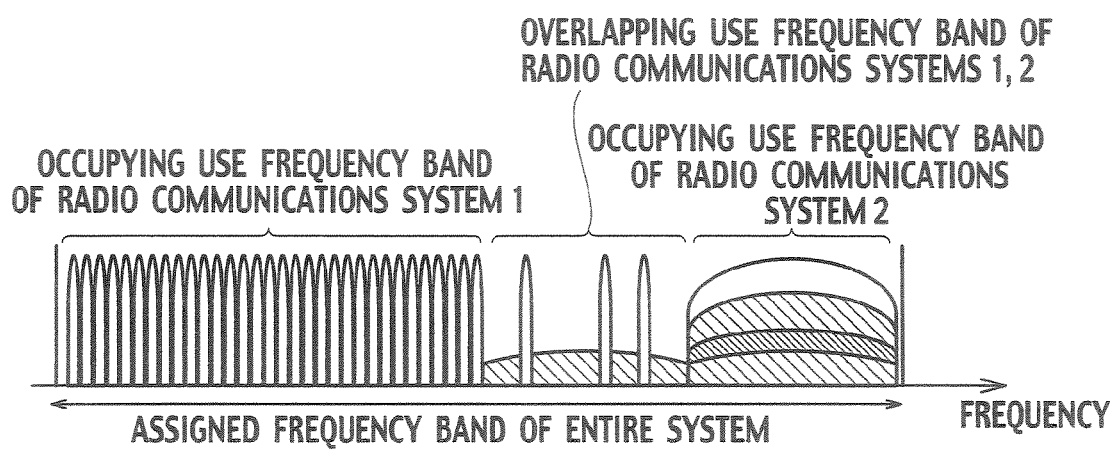
(b)
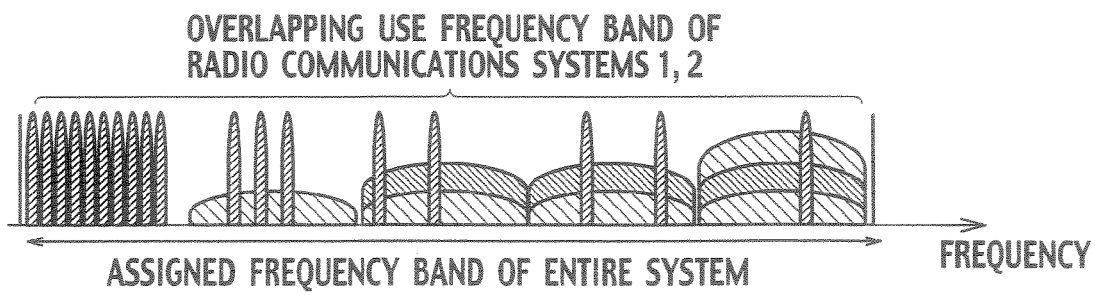

FREQUENCY CHANNEL ASSIGNMENT SYSTEM, BASE STATION, CONTROL STATION, INTER-SYSTEM COMMON CONTROL APPARATUS, FREQUENCY CHANNEL ASSIGNMENT METHOD, AND CONTROL METHOD

TECHNICAL FIELD

The present invention relates to a frequency channel assignment system, a base station a control station, an inter-system common control apparatus, a frequency channel assignment method, and a control method, configured to assign frequency channels to be used for radio communication between mobile stations and base stations in a plurality of radio communications systems which use a common frequency band.

BACKGROUND ART

In recent years, with changes in demand for services, cellular radio communications systems have been switching from second-generation mobile communication systems (such as Personal Digital Cellular (PDC)) to third-generation mobile communication systems (such as Wideband direct sequence Code Division Multiple Access (W-CDMA)).

Moreover, it is expected that fourth-generation mobile communication systems will be introduced in the future for more sophisticated and diversified services. Also, radio communications systems other than cellular radio communications systems will be more diversified.

Current assignment of frequency bands (frequency channels) to radio communications systems is essentially fixed assignment of a required frequency band to a single radio communications system, so as to avoid inter-system interference with another radio communications system.

However, with future diversification of radio communications systems, it will become difficult to reserve frequency bands, and there is a need for a technology for a plurality of radio communications systems for different uses to share the same frequency band.

Such a technology for sharing will allow flexible and efficient radio communications systems to be developed according to demand of the market and users. For a plurality of radio communications systems to share a frequency band, however, an interference avoiding technology for reducing degradation in communication quality and system capacity will be required.

As an example of using the same frequency band by a plurality of radio communications systems, a mixed communication environment of a wireless LAN radio communications system standardized in IEEE 802.11b and a Bluetooth radio communications system which use an Industrial, Scientific, and Medical (ISM) band of 2400 to 2483.5 MHz as shown in FIGS. 1(a) and 1(b) is known.

As shown in FIG. 1(a), frequency channels used in the wireless LAN system are within a range of 2412 to 2484 MHz and are assigned, overlapping at 5 MHz intervals. On the other hand, frequency channels used in the Bluetooth system are within a range of 2402 to 2480 MHz, and are set without overlapping at 1 MHz intervals.

As shown in FIG. 1(b), in the wireless LAN system, high-speed wireless LAN data with a 1210 μsec length modulated by Direct Sequence Spread Spectrum (DSSS) system is transmitted. In the Bluetooth system, Bluetooth data modulated by Frequency Hopping Spread Spectrum (FHSS) system which randomly changes a transmission frequency within a 79 MHz band every 625 μsec is transmitted.

Therefore, when the wireless LA system and the Bluetooth system are used at the same time, two pieces of Bluetooth data are transmitted while one piece of high-speed wireless LAN data is transmitted. At this time, if a frequency band hopped in the Bluetooth system overlaps a frequency band used by the wireless TAN system as shown in FIG. 1(b), a data collision (mutual interference) occurs between them, causing loss of data.

As measures to avoid such data collisions in radio communications systems, various methods have been proposed. In the wireless LA systems the Carrier Sense Multiple Access with Collision Avoidance (CSMA/CA) system is currently applied to avoid data collisions. In the Bluetooth systems, the Adaptive Frequency Hopping (AFH) system is used.

In the CSMA/CA system, in addition to carrier sense, a preamble is transmitted before transmitting data from a transmitting terminal to a receiving terminal. Only when there is a response from the receiving terminal, the data is transmitted, so that a data collision with another transmitting terminal can be avoided. In the AFH system, frequency hopping is performed, adaptively avoiding a frequency band in which a data collision will occur, so that mutual interference can be avoided.

As another example of the case where a plurality of radio communications systems are in the same frequency band, a mixed communication environment of an Orthogonal Frequency Division Multiplex/Time Division Multiple Access (OFDM/TDMA) system and a GSM system having compatibility with the OFDM/TDMA system is disclosed in a patent document 1.

Specifically, the patent document 1 discloses a technology in which, as shown in FIG. 2(a), subcarriers in the OFDM/TDMA system are assigned to frequency bands which do not overlap frequency channels in the GSM system, and, as shown in FIG. 2(b), an integer multiple of an OFDM/TDMA slot is made to be equal to one or an integral number of GSM slots, and a pilot symbol is assigned to every (n−1) subcarrier ("n" is an integer more than one), so that occupied bandwidths for carriers in the radio communications systems can be used without overlapping between the radio communications systems.

In a cellular radio communications system in which a limited frequency band is used only by a single radio communications system, control of frequency band assignment at base stations is performed with the impact of interference by channels in the same frequency band in the single radio communications system taken into account.

In conventional Frequency Division Multiple Access (FDMA) and Time Division Multiple Access (TDMA) radio communications systems, when frequency channels are fixedly assigned for use at base stations, the limit value of the Carrier to Interference power Ratio (CIR) necessary for maintaining a required communication quality is specified, and the repeated use distance of channels in the same frequency band and channels in an adjacent frequency band is determined so that the CIR locational degradation rate is lower than or equal to a predetermined value.

Here, when the repeated use distance is small, channels in the same frequency band can be repeatedly used geographically densely, so that the number of frequency channels available at each base station is increased and the system capacity is increased, while interference by channels in the same frequency band used at another base station increases the deterioration rate of communication quality.

On the other hand, when the repeated use distance is large, the deterioration rate of communication quality can be held down, while the number of frequency channels available at each base station is reduced and the system capacity is reduced.

In conventional FDMA and TDMA radio communications systems, a threshold of the repeated use distance or the amount of interference for guaranteeing communication quality is predetermined, and frequency channel design is performed without exceeding the threshold.

In a conventional single radio communications system, in contrast to the above-described fixed channel assignment, the Dynamic Channel Assignment (DCA) is known which performs dynamic channel assignment in order to increase system capacity and frequency use efficiency.

In the CDMA radio communications systems, repeated arrangement of channels in the same frequency band is theoretically possible. However, when a plurality of microcells using the same frequency bard for communication are located in a macrocell, the DCA is still effective as a measure against interference between channels in the same frequency band in the macrocell.

In such CDMA radio communications systems, a hierarchical cell structure in which microcells are located in a macrocell for example may be adopted. A technology for effectively using a frequency band in the hierarchical cell structure is disclosed in a patent document 2 and a non-patent document 1.

The patent document 2 proposes a method in which, in the case where a macrocell radio communications system and a microcell radio communications system, which are different in transmission speed share the same frequency band, when one radio communications system is short of assignable frequency channels, permission to use is given sequentially from an unused frequency channel of low priority in the other radio communications system and a partition as the boundary between a frequency band in the macrocell and a frequency band in the microcells is shifted. (See FIGS. 3(a) and 3(b)).

In the technology according to the patent document 2, high-priority frequency channels are rearranged during dynamic frequency channel assignment to a macrocell in the macrocell and a plurality of microcells in the macrocell.

Patent document 1: Japanese published unexamined application No. 2000-69575
Patent document 2: Japanese published unexamined application No. H11-205848
Non-patent document 1: Ogura Hirotsugu, "Frequency Channel Assignment Method and Network"

As described above, the conventional radio communications systems have the problem that, when a plurality of radio communications systems use the same frequency band, such as when a wireless LAN system and a Bluetooth system are mixed as shown in FIGS. 1(a) and 1(b), mutual interference between the radio communications systems reduces the communication capacity of the other radio communications systems.

Also, the conventional radio communications systems have the problem that, as shown in the Japanese published unexamined application No. 2002-111631, for example, a frequency band usable in one radio communications system is limited by a securable number of frequency channels in a frequency band used by the other radio communications system.

Also, conventional radio communications systems have the problem that traffic concentration in one radio communications system makes it difficult to secure frequency bands in the other radio communications system, making it impossible to handle uneven traffic distribution.

Generally, in cellular radio communications systems, since mutual interference between channels in the same frequency band degrades communication quality, the amount of interference and the allowable amount of interference (an interference amount threshold set in each radio communications system) on a particular frequency channel are compared to determine whether the frequency channel can be used or not.

Also, in the FDMA and TDMA radio communications systems, the above-described allowable amount of interference is determined to meet a required communication quality, according to various parameters (such as modulation systems and error correction technologies), the number of repeated use of channels in the same frequency band, the type of traffic, and the like in the radio communications systems.

On the other hand, in the CDMA radio communications systems, since spreading gain can be obtained by spreading transmission signals, interference tolerance is large, and repeated use of channels in the same frequency band in a single cell is possible. The allowable amount of interference varies, depending on the variable spreading ratio and transmission power control according to traffic and the type of traffic.

The impact of two radio communications systems having different characteristics to interference when sharing the same frequency band without applying interference avoidance control is shown in FIGS. 4(a) and 4(b).

As shown in FIG. 4(a), the FDMA radio communications system has had a problem that when the amount of interference increases over the allowable amount of interference, frequency channel assignment becomes difficult. In particular, the FDMA radio communications system suffers strong interference, not only in the same cell but also from an adjacent cell, from the CDMA radio communications system which performs repeated use of channels in the same frequency band in a single cell.

Also as shown in FIG. 4(b), the CDMA radio communications system has had a problem that when the amount of interference from the FDMA radio communications system increases, the system capacity is reduced.

For these reasons, it is necessary to assign frequency channels, taking account of interference in the radio communications systems to make such adjustments that the amount of interference is made lower than or equal to the allowable amount of interference for the FDMA radio communications system, and a sufficient system capacity can be secured for the CDMA radio communications system.

In addition, when two radio communications systems use different frequency bandwidths impacts on transmission characteristics as shown in FIGS. 5(a) and 5(b) are generated.

In terms of narrowband signals, as shown in FIG. 5(a), there is a problem that interference exceeding the allowable amount of interference with a number of consecutive narrowband signals is generated, and transmission becomes difficult. In terms of wideband signals, as shown in FIG. 5(b), there is a problem that notches due to narrowband signals occur in a frequency bandwidth used, distorting the signal waveform, and thereby deteriorating transmission quality. Thus, control is required to maintain transmission quality in each radio communications system.

DISCLOSURE OF THE INVENTION

The present invention has been made in view of the above problems, and has an object of implementing a frequency channel assignment system, a base station, a control station, an inter-system common control apparatus, a frequency channel assignment method, and a control method which allow adaptive overlapping use of the same frequency band.

A first aspect of the present invention is summarized as a frequency channel assignment system including a plurality of radio communications systems which use a common frequency band, and a controller; wherein the controller includes: a system characteristics information management function configured to manage system characteristics information showing characteristics of frequency channels in the radio communications systems; and a frequency channel assignment function configured to assign the frequency channels to each of the radio communications systems, based on the system characteristics information and channel status information showing status of the frequency channels, so as to avoid inter-system interference.

In the first aspect of the present invention, the controller can further include a required frequency channel calculation function configured to calculate the number of frequency channels required at a base station, based on at least one of call loss probability and traffic at the base station; and the frequency channel assignment function can be configured to assign the frequency channels to each of the radio communications systems, based on the system characteristics information, the channel status information, and the required number of frequency channels, so as to avoid inter-system interference.

In the first aspect of the present invention, the controller can include a control apparatus provided in each of the plurality of radio communications systems, and an inter-system common control apparatus connected to the plurality of radio communications systems; the control apparatus can include a function of collecting the channel status information; a function of calculating the required number of frequency channels; and a notification function configured to notify the required number of frequency channels and the channel status information to the inter-system common control apparatus; and the intersystem common control apparatus can include: a function of managing the system characteristics information; a function of assigning the frequency channels; and a frequency channel notification function configured to notify the assigned frequency channels to each of the control apparatuses.

In the first aspect of the present invention the inter-system common control apparatus can be provided in a control station in a given radio communications system of the plurality of radio communications systems.

In the first aspect of the present invention, as the system characteristics information, at least one of overlapping use possibility on the frequency channels, priority of assigning the frequency channels, the allowable amount of interference on the frequency channels, and frequency bandwidth used on the frequency channels can be used.

In the first aspect of the present invention, as the channel status information, at least one of use status of the frequency channels, the amount of interference on the frequency channels, and radio path change on the frequency channels can be used.

A second aspect of the present invention is summarized as a base station for performing radio communication with mobile stations, using frequency channels in radio communications systems, including: a channel status information collection function configured to collect channel status information showing status of frequency channels at the base station; a system characteristics information management function configured to manage system characteristics information showing characteristics of frequency channels in the radio communications systems; and a frequency channel selection function configured to select frequency channels for use between the base station and the mobile stations, based on the system characteristics information and the channel status information.

In the second aspect of the present invention, the base station can further include: a measurement function configured to measure at least one of call loss probability and traffic at the base station; and a required frequency channel number calculation function configured to calculate the number of frequency channels required at the base station, based on at least one of the call loss probability and the traffic at the base station; wherein the frequency channel selection function can be configured to select frequency channels for use between the base station and the mobile stations, based on the system characteristics information, the channel status information, and the required number of frequency channels.

A third aspect of the present invention is summarized as a control station for controlling a plurality of base stations in radio communications systems, including: a channel status information collection function configured to collect channel status information showing status of frequency channels at each of the base stations; and a required frequency channel number calculation function configured to calculate the numbers of frequency channels required at the base stations, based on at least one of call loss probability and traffic at the base stations wherein the control station is configured to select frequency channels for use between the base stations and mobile stations, based on the system characteristics information, the channel status information, and the required numbers of frequency channels.

A fourth aspect of the present invention is summarized as an inter-system common control apparatus connected to a plurality of radio communications systems, including: a system characteristics information management function configured to manage system characteristics information showing characteristics of frequency channels in the radio communications systems; a collection function configured to collect channel status information showing status of frequency channels at base stations in the radio communications systems, and the numbers of frequency channels required at the base stations, from control stations in the radio communications systems; a frequency channel assignment function configured to assign frequency channels to each of the radio communications systems, based on the managed system characteristics information, and the channel status information and the required numbers of frequency channels notified from the control stations; and a frequency channel communication function configured to notify the assigned frequency channels to the control stations in the radio communications systems.

In the fourth aspect of the present invention, for each frequency channel available at the base stations in the radio communications systems, at least one of overlapping use possibility on the frequency channel, priority of assigning the frequency channel, the allowable amount of interference on the frequency channel, and frequency bandwidth used on the frequency channel can be managed as the system characteristics information.

A fifth aspect of the present invention is summarized as a frequency channel assignment method for assigning frequency channels to be used for radio communication between mobile stations and base stations in a plurality of radio communications systems which use a common frequency band, the method including: collecting, at a controller, channel status information showing status of frequency channels at each of the base stations; calculating, at the controller, the number of frequency channels required at each of the base stations, based on the collected channel status information; assigning, at the controller, frequency channels to each of the radio communications systems, based on system characteristics information showing characteristics of frequency channels in the radio communications systems, the channel status information, and the required number of frequency channels;

notifying, at the controller, the assigned frequency channels to the base stations; and performing, at the base stations, radio communication with the mobile stations, using the frequency channels notified from the controller.

A sixth aspect of the present invention is summarized as a control method at base stations for performing radio communication with mobile stations, using frequency channels in radio communications systems, the method including: collecting, at the base stations, channel status information showing status of frequency channels at the base stations; managing at the base stations, system characteristics information showing characteristics of frequency channels in the radio communications systems; calculating, at the base stations, the numbers of frequency channels required at the base stations, based on at least one of call loss probability and traffic at the base stations; and selecting, at the base stations, frequency channels for use between the base stations or the other base stations and the mobile stations, based on the system characteristics information, the channel status information and the required numbers of frequency channels.

A seventh aspect of the present invention is summarized as a control method at a control station for controlling a plurality of base stations in radio communications systems, the method including: collecting, at the control station, channel status information showing status of frequency channels at the base stations; calculating, at the control station, the numbers of frequency channels required at the base stations, based on at least one of call loss probability and traffic at the base stations; and selecting, at the control station, frequency channels for use between the base stations and mobile stations, based on the system characteristics information, the channel status information, and the required numbers of frequency channels.

BRIEF DESCRIPTION OF DRAWINGS

FIGS. 1(a) and 1(b) are diagrams for illustrating a mixed communication environment of a conventional wireless LAN system and Bluetooth system;

FIGS. 2(a) and 2(b) are diagrams for illustrating a mixed communication environment of a conventional OFDM/TDMA system and GSM system;

FIGS. 3(a) and 3(b) are diagrams for illustrating a dynamic frequency channel assignment algorithm according to a related art;

FIGS. 5(a) and 5(b) are diagrams illustrating the impact of using a frequency band by two radio communications systems having different characteristics to interference;

FIGS. 6(a) and 6(b) are diagrams illustrating examples of frequency band assignment in a frequency channel assignment system according to an embodiment of the present invention;

FIG. 11 is a diagram illustrating an example of a data management table used in the frequency assignment system according to the embodiment of the present invention;

FIG. 12 is a sequence diagram illustrating a call operation (success) in the frequency assignment system according to the embodiment of the present invention;

FIGS. 16(a) and 16(b) are diagrams illustrating the concept of dynamically assigning frequency bands in the frequency assignment system according to the embodiment of the present invention;

BEST MODE FOR CARRYING OUT THE INVENTION

Frequency Assignment System in an Embodiment of the Invention

With reference to FIGS. 6(a) to 16(b), a frequency assignment system according to an embodiment of the present invention will be described.

FIGS. 6(a) and 6(b) show examples of assigning the same frequency band to a plurality of radio communications systems. Radio communications systems 1 to 3 are radio communications systems which are different in both the usage pattern and the communication mode, or radio communications systems which are different in one of the usage pattern and the communication mode.

FIG. 6(a) is an example where the radio communications systems 1 to 3 use the same frequency bandwidth. FIG. 6(b) is an example where frequency bands used by the radio communications systems 1 to 3 overlap.

Figure 4:
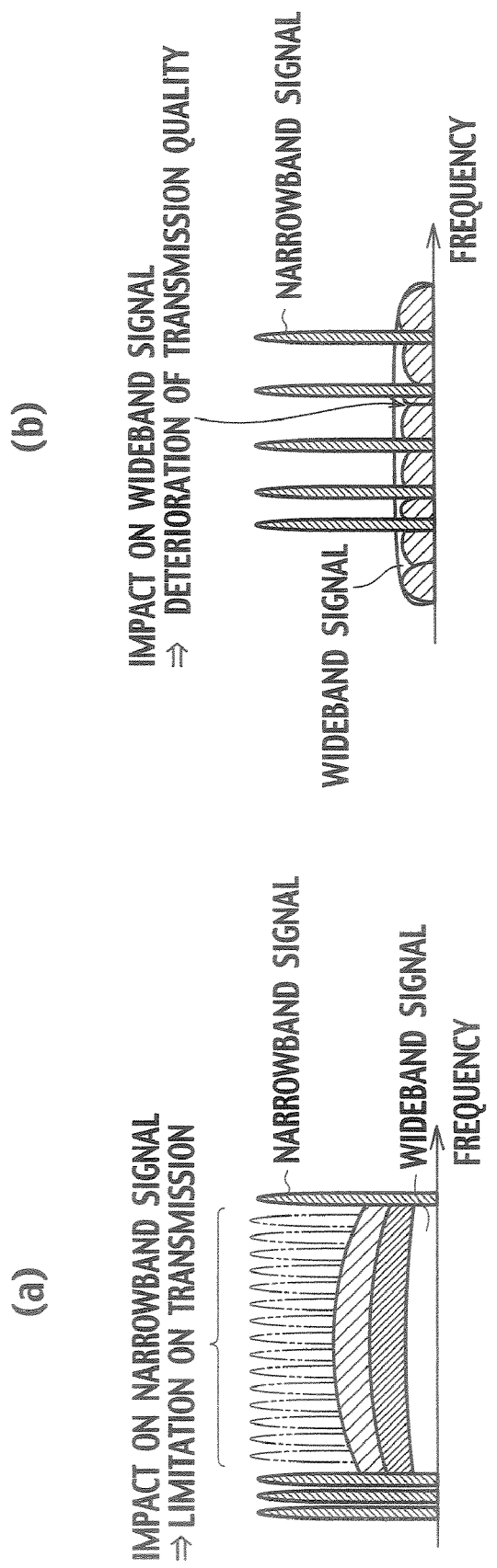
FIGS. 4(a) and 4(b) are diagrams illustrating the impact of sharing a frequency band by two radio communications systems which use different frequency bandwidths.
Figure 7:
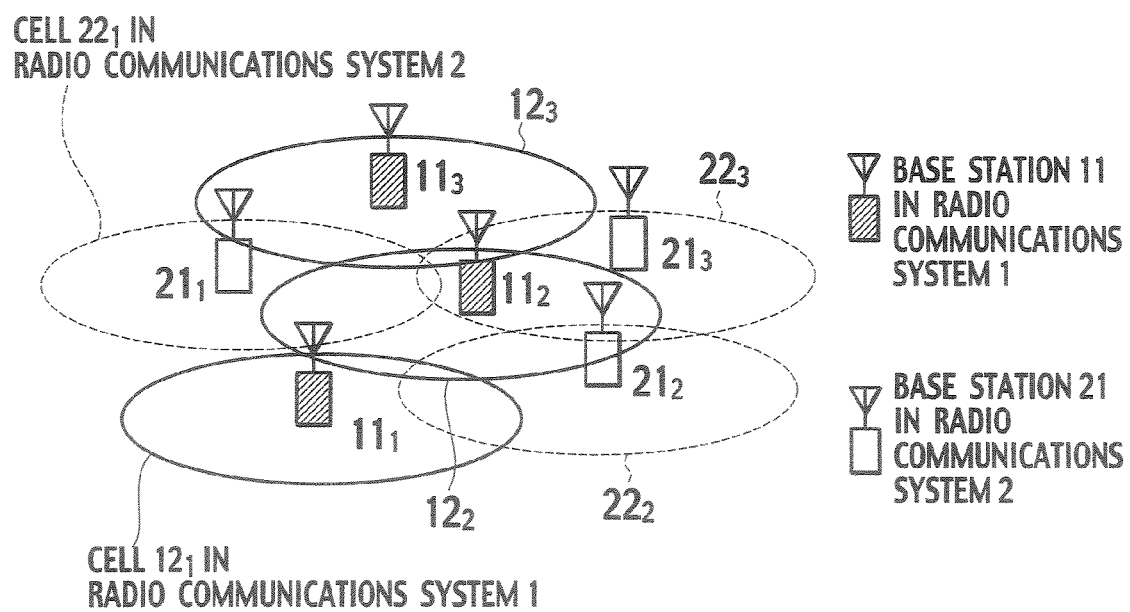
FIG. 7 is an overall configuration diagram of radio communications systems to which the frequency channel assignment system according to the embodiment of the present invention is applied.
Figure 8:
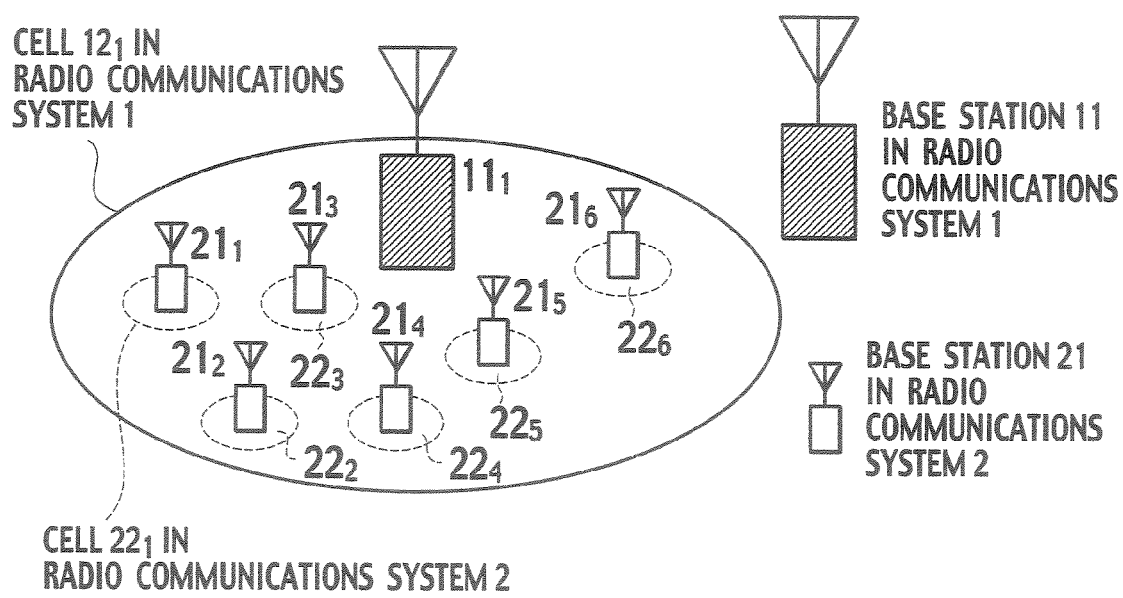
FIG. 8 is an overall configuration diagram of radio communications systems to which the frequency channel assignment system according to the embodiment of the present invention is applied.

FIGS. 7 and 8 show examples of radio communications systems 1 and 2 which spread out, overlapping geographically.

In the example of FIG. 7, cells $12_1$ to $12_3$, which are areas covered by base stations $11_1$ to $11_3$ in the radio communications system 1, overlap cells $22_1$ to $22_3$, which are areas covered by base stations $21_1$ to $21_3$ in the radio communications system 2.

The example of FIG. 8 is a hierarchical structure in which a cell $12_1$ in the radio communications system 1 includes cells $22_1$ to $22_6$ in the radio communications system 2.

In both the examples of FIGS. 7 and 8, the radio communications systems 1 and 2 are used for different purposes, overlapping geographically. That is, the radio communications systems 1 and 2 using the same frequency band interfere with each other by being operated in the same region.

The frequency assignment system according to this embodiment is applied to the radio communications systems 1 and 2 as shown in FIGS. 7 and 8, and assigns frequency channels, taking account of interference from the other radio communications system, and thereby implementing efficient frequency use while maintaining a high-quality communication quality.

Figure 9:
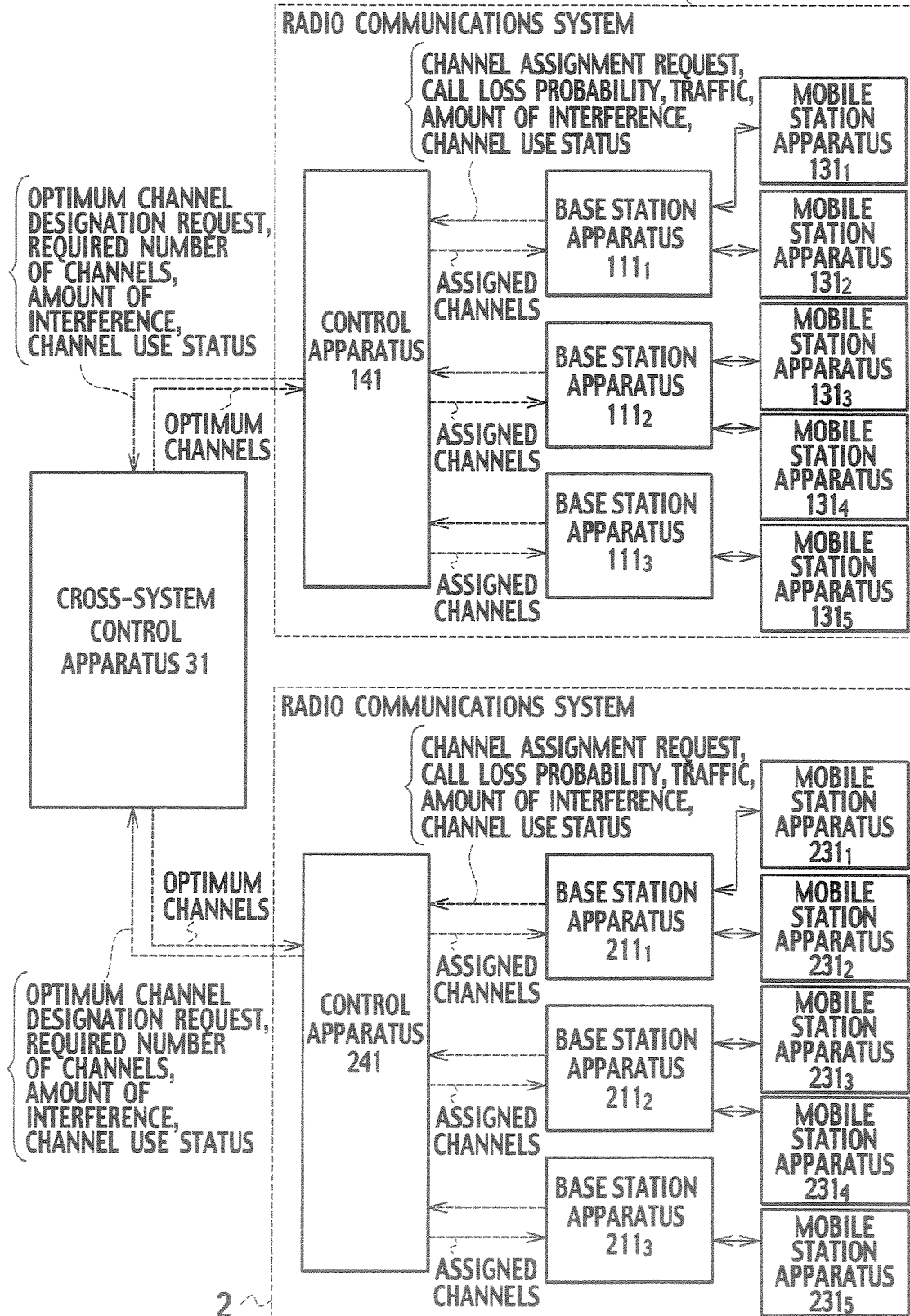
FIG. 9 is an overall configuration diagram of a frequency assignment system according to the embodiment of the present invention.

As shown in FIG. 9, the frequency assignment system according to this embodiment includes radio communications systems 1 and 2 which use a common frequency band, and a controller. Specifically, the radio communications system 1 includes mobile station apparatuses $131_1$ to $131_5$ base station apparatuses $111_1$ to $111_3$ and a control station apparatus 141. The radio communications system 2 includes mobile station apparatuses $231_1$ to $231_5$, base station apparatuses $211_1$ to $211_3$ a control station apparatus 241, and an inter-system common control apparatus 31.

The controller is configured by the control station apparatus 241 and the inter-system common control apparatus 31. In the example of FIG. 9, the control apparatuses 141 and 241 are provided in the radio communications systems 1 and 2, respectively, and the inter-system common control apparatus 31 is connected to the radio communications systems 1 and 2.

Figure 10:
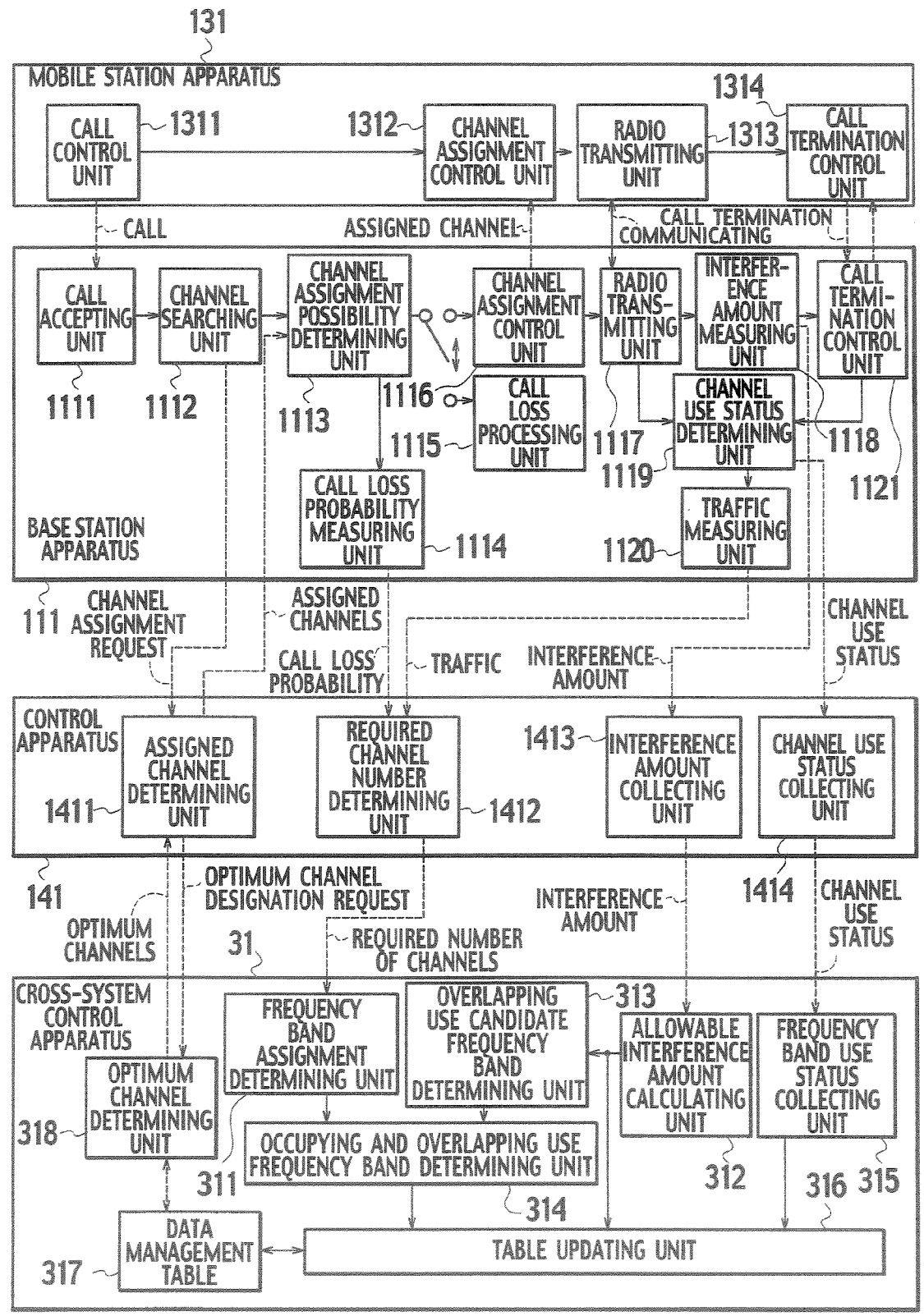
FIG. 10 is a functional block diagram of a mobile station apparatus, a base station apparatus, a control apparatus, and an inter-system common control apparatus in the frequency assignment system according to the embodiment of the present invention.

With reference to FIG. 10, detailed configurations of the base station apparatuses 111, mobile station apparatuses 131, and mobile station apparatuses 231 will be described. In this embodiment, the mobile station apparatuses $131_1$ to $131_5$ and $231_1$ to $231_5$ have the same configuration, and the base station apparatuses $111_1$ to $111_3$ and $211_1$ to $211_3$ have the same configuration, and the control apparatuses 141 and 241 have the same configuration.

As shown in FIG. 10, the base station apparatus 111 includes a call accepting unit 1111, a channel searching unit 1112, a channel assignment possibility determining unit 1113, a call loss probability measuring unit 1114, a call loss processing unit 1115, a channel assignment control unit 1116, a radio transmitting unit 1117, an interference amount measuring unit 1118, a channel use status determining unit 1119, a traffic measuring unit 1120, and a call termination control unit 1121.

The call accepting unit 1111 is configured to perform reception processing on a call from a call control unit 1311 of the mobile station apparatus 131, and instruct the channel searching unit 1112 to search for a frequency channel to assign.

The channel searching unit 1112 is configured to transmit a channel assignment request for requesting assignment of a frequency channel to an assigned channel determining unit 1411 of the control apparatus 141, according to an instruction from the call accepting unit 1111.

The channel assignment possibility determining unit 1113 is configured to determine whether a frequency channel can be assigned or not, based on information about frequency channels assigned by the assigned channel determining unit 1411 (including information as to whether there is an assignable frequency channel or not).

The call loss probability measuring unit 1114 is configured to calculate the call loss probability in a cell under the base station apparatus 111 (which is used for calculating the number of channels required in the radio communications system), based on the result of determination at the channel assignment possibility determining unit 1113, and notify it to a required channel determining unit 1412 of the control apparatus 141.

The call loss processing unit 1115 is configured to perform call loss processing for the mobile station apparatus 131 when the channel assignment possibility determining unit 1113 determines that there is not an assignable frequency channel.

On the other hand, when the channel assignment possibility determining unit 1113 determines that there is an assignable frequency channel, the channel assignment control unit 1116 is configured to transmit a control signal for assigning a frequency channel to be used for radio communication between the base station apparatus 111 and the mobile station apparatus 131 (including information specifying an assigned frequency channel) to a channel assignment control unit 1312 of the mobile station apparatus 131.

The radio transmitting unit 1117 is configured to perform radio communication with a radio transmitting unit 1313 of the mobile station apparatus 131, according to an instruction from the channel assignment control unit 1116.

The interference amount measuring unit 1118 is configured to measure, at certain time intervals, the amounts of interference such as interference power (communication quality used for determining whether overlapping use of a frequency band with another radio communications system is possible or not; such as interference power per carrier) on frequency channels available in the radio communications system including frequency channels used at the base station apparatus 111, and notify them to an interference amount collecting unit 1413 of the control apparatus 141.

The channel use status determining unit 1119 is configured to determine the status of use of frequency channels at the base station apparatus 111, based on frequency channel assignment processing by the channel assignment control unit 1116 and frequency channel release processing by the call termination processing unit 1121, and notify the channel use status showing the determination result to the traffic measuring unit 1120 and a channel use status collecting unit 1414 of the control apparatus 141.

The traffic measuring unit 1120 is configured to measure traffic which has been carried by released frequency channels (which is used for calculating the number of channels required in the radio communications system), and notify it to the required channel determining unit 1412 of the control apparatus 141.

The call termination processing unit 1121 is configured to transmit a control signal for terminating a call to a call termination control unit 1314 of the mobile station apparatus 131 to perform frequency channel release processing and terminate radio communication between the mobile station apparatus 131 and the base station apparatus 111.

The control apparatus 141 includes the assigned channel determining unit 1411, the required channel number determining unit 1412, the interference amount collecting unit 1413, and the channel use status collecting unit 1414, as shown in FIG. 10.

The assigned channel determining unit 1411 is configured to transmit an optimum channel designation request for requesting an optimum channel determining unit 318 of the inter-system common control apparatus 1 to determine available frequency channels (optimum channels), referring to a data management table 317, according to a channel assignment request from the channel searching unit 1112 of the base station apparatus 111.

Also, the assigned channel determining unit 1411 is configured to receive information on optimum channels from the optimum channel determining unit 318 of the inter-system common control apparatus 31 (including information as to whether there are available channels or not) and notify it as assigned channels to the channel assignment possibility determining unit 1113 of the base station apparatus 111.

The required channel number determining unit 1412 is configured to calculate the required number of channels necessary for the radio communications system to meet a required call loss probability, based on the call loss probability at each base station apparatus 111 (or cell) and traffic on each frequency channel in the radio communications system, and notify it to a frequency band assignment determining unit 311 of the inter-system common control apparatus 31.

That is, the required channel number determining unit 1412 constitutes a required frequency channel calculation function configured to calculate the number of frequency channels required at a base station, based on call loss probability at the base station.

The interference amount collecting unit 1413 is configured to collect the amounts of interference notified from a plurality of base station apparatuses, and notify them to an allowable interference amount calculating unit 312 of the intersystem common control apparatus 31.

The interference amount collecting unit 1413 is configured to collect the amounts of interference at certain times such as times when the frequency channel use status changes, or periodic times at regular time intervals, or times when a predetermined reference value such as call loss probability or traffic significantly changes.

The channel use status collecting unit 1414 is configured to collect the channel use status at each base station apparatus notified from a plurality of base station apparatuses, and notify it to a frequency use status collecting unit 315 of the inter-system common control apparatus 31.

The channel use status collecting unit 1414 is configured to collect the channel use status at certain times such as times when the frequency channel use status changes, or periodic times at regular time intervals, or times when a predetermined reference value such as call loss probability or traffic significantly changes.

Here, the interference amount collecting unit 1413 and the channel use status collecting unit 1414 constitute a channel status information collection function configured to collect channel status information.

The inter-system common control apparatus 31 includes, as shown in FIG. 10, the frequency band assignment determining unit 311, the allowable interference amount calculating unit 312, an overlapping use candidate frequency band determining unit 313, an occupying and overlapping use frequency band determining unit 314, the frequency band use status collecting unit 315, a table updating unit 316, the data management table 317, and the optimum channel determining unit 318.

The frequency band assignment determining unit 311 is configured to calculate required frequency bands for radio communications systems (or cells or base station apparatuses), according to the numbers of channels required at base station apparatuses in their respective radio communications systems notified from a plurality of control apparatuses.

The allowable interference amount calculating unit 312 is configured to calculate the allowable amount of interference (a threshold of the amount of interference) which allows communication quality to be maintained for each frequency band at each base station apparatus (or each cell) in each radio communications system, and input it to the overlapping use candidate frequency band determining unit 313 and the table updating unit 316.

The overlapping use candidate frequency band determining unit 313 is configured to determine a candidate for a frequency band which can be used in an overlapping manner between a plurality of radio communications systems, based on the allowable amounts of interference inputted from the allowable interference amount calculating unit 312.

The occupying and overlapping use frequency band determining unit 314 is configured to determine a frequency band to be occupied by each radio communications system and a frequency band to be used in an overlapping manner between a plurality of radio communications systems, from the output results of the frequency band assignment determining unit 311 and the overlapping use candidate frequency band determining unit 313, and output information on a frequency band for overlapping use to the table updating unit 316.

The frequency band use status collecting unit 315 is configured to collect the frequency band use status in each radio communications system, and input it to the table updating unit 316.

The table updating unit 316 is configured to update each information item in the data management table 317, according to input from the allowable interference amount calculating unit 312, the occupying and overlapping use frequency band determining unit 314 and the frequency band use status collecting unit 315 (such as a change in the allowable interference amount, a change in the frequency band use status, and a change in the occupying use frequency band (or overlapping use frequency band)).

FIG. 11 shows an example of the data management table 317 used in the frequency assignment system according to this embodiment. The data management table 317 is managed by the inter-system common control apparatus 31.

As shown in FIG. 11, the data management table 317 manages, for each cell in each radio communications system, "Channel Number ($N11n$, $N21n$)" for identifying frequency channels, "Priority ($P11n$, $P21n$)" showing priorities for assigning the frequency channels, "Occupying Use or Overlapping Use" showing possibilities of overlapping use on the frequency channels, "Channel Use Status (unused or used)" showing the status of use of the frequency channels, "Interference Amount ($I11n$, $I21n$)" on the frequency channels, and "Allowable Interference Amount ($A11n$, $A21n$)" on the frequency channels, which are associated with one another.

Here, the "Priority", "Occupying Use or overlapping Use" and "Allowable Interference Amount" constitute system characteristics information showing the characteristics of frequency channels in each radio communications system (cell). Alternatively, as system characteristics information, other information such as frequency bandwidths used for frequency channels may be used.

The "Channel Use Status" and "Interference Amount" constitute channel status information showing the status of frequency channels. Alternatively, as channel status information, radio path changes in frequency channels may be used.

Here, the "Interference Amount" on a frequency channel shows the total amount of interference including not only an amount of interference from the same frequency channel but also an amount of interference from an adjacent channel.

The "Allowable Interference Amount" on a frequency channel includes, for example, an "interference immunity characteristic", a "maximum amount of interference up to which interference can increase with good communication maintained", an "expected value of the allowable amount of interference estimated from channel status information" and a "limit value of the allowable amount of interference actually measured with interference increased by a small amount."

In other words, the data management table 317 constitutes a system characteristics information management function configured to manage system characteristics information showing the characteristics of frequency channels in radio communications systems.

The optimum channel determining unit 31' is configured to determine optimum channels, referring to the data management table 317, in response to an optimum channel designation request from the assigned channel determining unit 1411 of the control apparatus 141, and return the determined optimum channels to the assigned channel determining unit 1411.

Frequency channels assigned preferentially as optimum channels are different for each radio communications system (base station apparatus or cell).

For example, when determining that assignment of frequency channels are allowed based on the amounts of interference and the allowable amounts of interference, the optimum channel determining unit 318 assigns frequency channels according to priorities P11n and P21n in the radio communications systems 1 and 2, thereby being able to assign frequency bands in such a manner that, as shown in FIG. 16(a) to be described below, occupied frequency bands and an overlapping use frequency band of the radio communications systems are mixed. For example, in the radio system 1, frequency channels in a low frequency band have high priorities, and in the radio system 2, frequency channels in a high frequency band have high priorities.

On the other hand, when frequency channels in different radio communications systems use a frequency band without waste, the optimum channel determining unit 318 can assign a frequency band in such a manner that the entire frequency band is made to be an overlapping use frequency band as shown in FIG. 16(b).

That is, the optimum channel determining unit 318 constitutes a frequency channel assignment function configured to assign frequency channels to each radio communications system, based on the system characteristics information and the channel status information, so as to avoid inter-system interference.

FIG. 12 shows the operation of establishing communication between the mobile station apparatus 131 and the base station apparatus 111 in the frequency assignment system according to this embodiment in the case where a frequency band is used in an overlapping manner.

As shown in FIG. 12, in step (C1) the mobile station apparatus 131 in the radio communications system 1 performs call processing toward the base station apparatus 111.

In step (C2), according to the call processing in step (C1), the base station apparatus 111 transmits a channel assignment request for requesting the control apparatus 141 to assign a necessary frequency channel.

In step (C3) in compliance with the channel assignment request in step (C2), the control apparatus 141 transmits an optimum channel designation request for requesting the inter-system common control apparatus 31 to designate an optimum frequency channel (frequency band) to be assigned to the call processing.

In step (C4), in compliance with the channel assignment request in step (C2), the control apparatus 141 calculates the number of frequency channels required (required channel number) at each base station apparatus 111 or 211, based on call loss probability (at each base station apparatus or each cell) and traffic (on each frequency channel) at the base station apparatus 111 or 211, and reports the required number of channels to the inter-system common control apparatus 31.

In step (C5), the inter-system common control apparatus 31 determines whether frequency channels (frequency bands) satisfying the required number of channels can be secured or not, based on the required number of channels at each base station apparatus 111 or 211 notified from the control apparatus 141.

When frequency channels (frequency bands) satisfying the required number of channels at the base station apparatus 111 can be secured, the inter-system common control apparatus 31 determines assignment of a frequency band required to the base station apparatus 111. Thereafter the inter-system common control apparatus 31 determines a frequency band to be occupied by the base station apparatus 111 and a frequency band to be used in an overlapping manner between a plurality of base station apparatuses.

In step (C6), the inter-system common control apparatus 31 updates the data management table 317, based on information about the determined frequency band to be occupied and the frequency band to be used in an overlapping manner.

In step (C7), the intersystem common control apparatus 31 designates optimum channels, referring to the data management table 317, in compliance with the optimum channel designation request in step (C3).

In step (C8), the inter-system common control apparatus 31 notifies the optimum channels to the control apparatus 141, and instructs it to assign the optimum channels as frequency channels.

In step (C9), the control apparatus 141 instructs the base station apparatus 111 to assign the optimum channels as frequency channels.

In step (C10), the base station apparatus 111 establishes communication with the mobile station apparatus 131, using a notified optimum channel.

In step (C11), the base station apparatus 111 measures, during communication, the amount of interference (e.g., communication quality such as interference power) on every frequency channel used.

In step (C12), the base station apparatus 111 notifies the measured amounts of interference to the control apparatus 141. That is, the amounts of interference measured at the base station apparatus 111 are once collected by the control apparatus 141.

In step (C13), the control apparatus 141 notifies the amounts of interference collected from the base station apparatus 111 to the inter-system common control apparatus 31.

In step (C14), the inter-system common control apparatus 31 updates the data management table 317, based on the notified amounts of interference. The inter-system common control apparatus 31 also calculates the allowable amount of interference in which communication quality can be maintained on each frequency channel at the base station apparatus 111, and updates the data management table 317, based on the calculated allowable amounts of interference. In addition, the inter-system common control apparatus 31 determines a candidate frequency band which can be used in an overlapping manner between a plurality of cells, based on the calculated allowable amounts of interference, and, based on the result, determines a frequency band to be occupied by a particular cell and a frequency band to be used in an overlapping manner between a plurality of cells, and updates the table updating unit 316.

In step (C15), after the mobile station apparatus 131 requests the base station apparatus 111 to release the frequency channel due to call termination or handover, communication between the mobile station apparatus 131 and the base station apparatus 111 is terminated, and the frequency channel is released.

In step (C16) the base station apparatus 111 reports the release of the frequency channel to the control apparatus 141.

In step (C17), the control apparatus 141 reports the release of the frequency channel to the inter-system common control apparatus 31.

In step (C18), the inter-system common control apparatus 31 updates the data management table 317, based on information about the frequency channel release processing.

Figure 13:
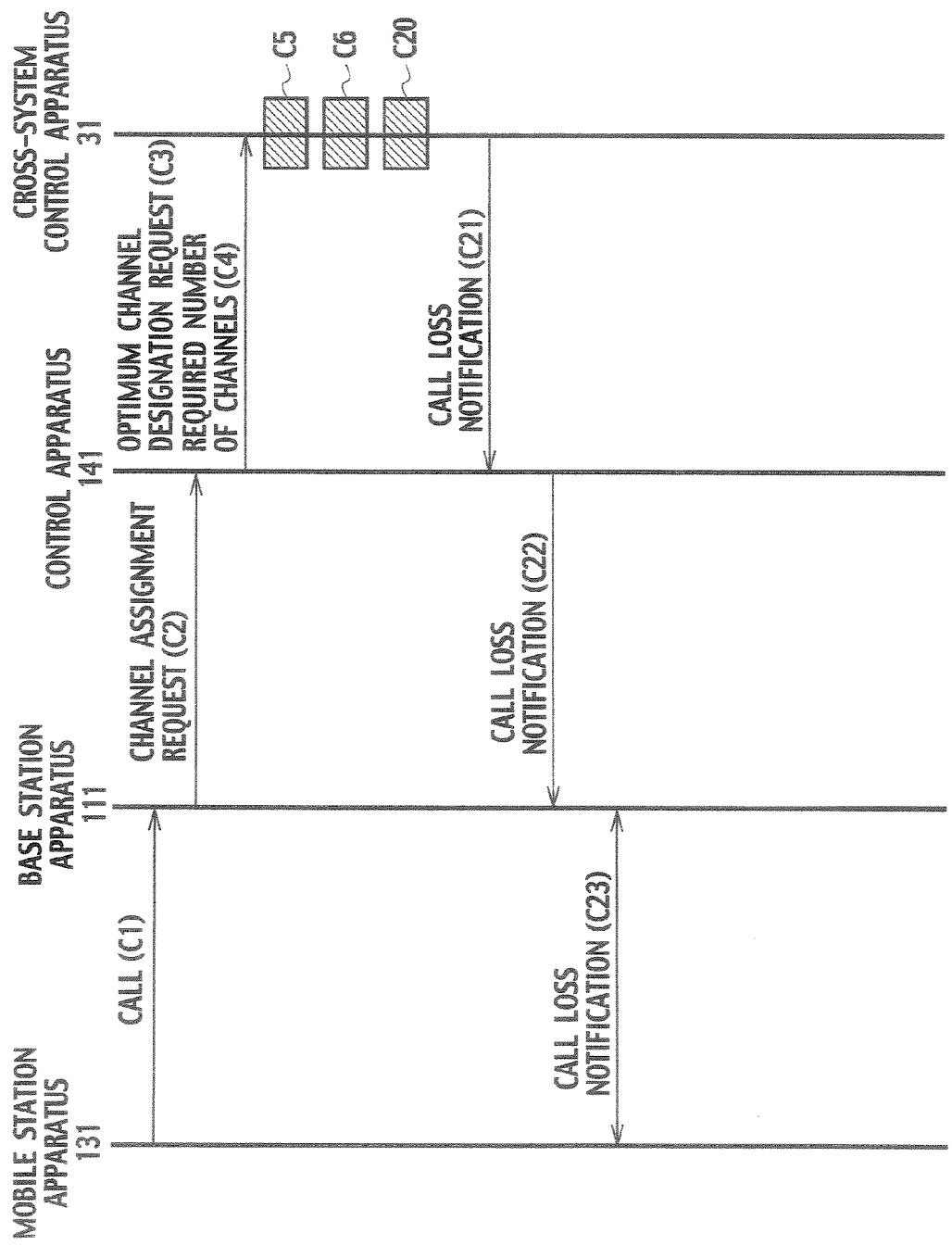
FIG. 13 is a sequence diagram illustrating a call operation (failure) in the frequency assignment system according to the embodiment of the present invention.

FIG. 13 shows an operation when call loss processing is performed without establishing communication between the mobile station apparatus 131 and the base station apparatus 111 in the frequency assignment system according to this embodiment in the case where a frequency band is used in an overlapping manner.

As shown in FIG. 13, in step (C1), the mobile station apparatus 131 in the radio communications system 1 performs call processing toward the base station apparatus 111.

In step (C2), in compliance with the call processing in step (C1), the base station apparatus 111 transmits a channel assignment request for requesting the control apparatus 141 to assign a necessary frequency channel.

In step (C3), in compliance with the channel assignment request in step (C2), the control apparatus 141 transmits an optimum channel designation request for requesting the inter-system common control apparatus 31 to designate an optimum frequency channel (frequency band) to be assigned to the call processing.

In step (C4), in compliance with the channel assignment request in step (C2), the control apparatus 141 calculates the number of frequency channels required (required channel number) at each base station apparatus 111 or 211, based on call loss probability (at each base station apparatus or each cell) and traffic (on each frequency channel) at the base station apparatus 111 or 211, and reports the required number of channels to the inter-system common control apparatus 31.

In step (C5), based on the required number of channels notified from the control apparatus 141, the inter-system common control apparatus 31 determines whether frequency channels (frequency bands) satisfying the required number of channels can be secured or not.

When frequency channels (frequency bands) satisfying the required number of channels can be secured at the base station apparatus 111, the inter-system common control apparatus 31 determines assignment of a frequency band required to the base station apparatus 111. Then, the inter-system common control apparatus 31 determines a frequency band to be occupied by the base station apparatus 111 and a frequency band to be used in an overlapping manner between a plurality of base station apparatuses.

In step (C6), the inter-system common control apparatus 31 updates the data management table 317, based on information about a determined frequency band to be occupied and frequency band to be used in an overlapping manner.

In step (C20), when optimum channels cannot be found, the inter-system common control apparatus 31 decides that call loss processing be performed.

In step (C21), the inter-system common control apparatus 31 instructs the control apparatus 141 to perform call loss processing.

In step (C22), the control apparatus 141 instructs the base station apparatus 111 to perform call loss processing.

In step (C23), the base station apparatus 111 performs call loss processing toward the call request from the mobile station 13.

Figure 14:
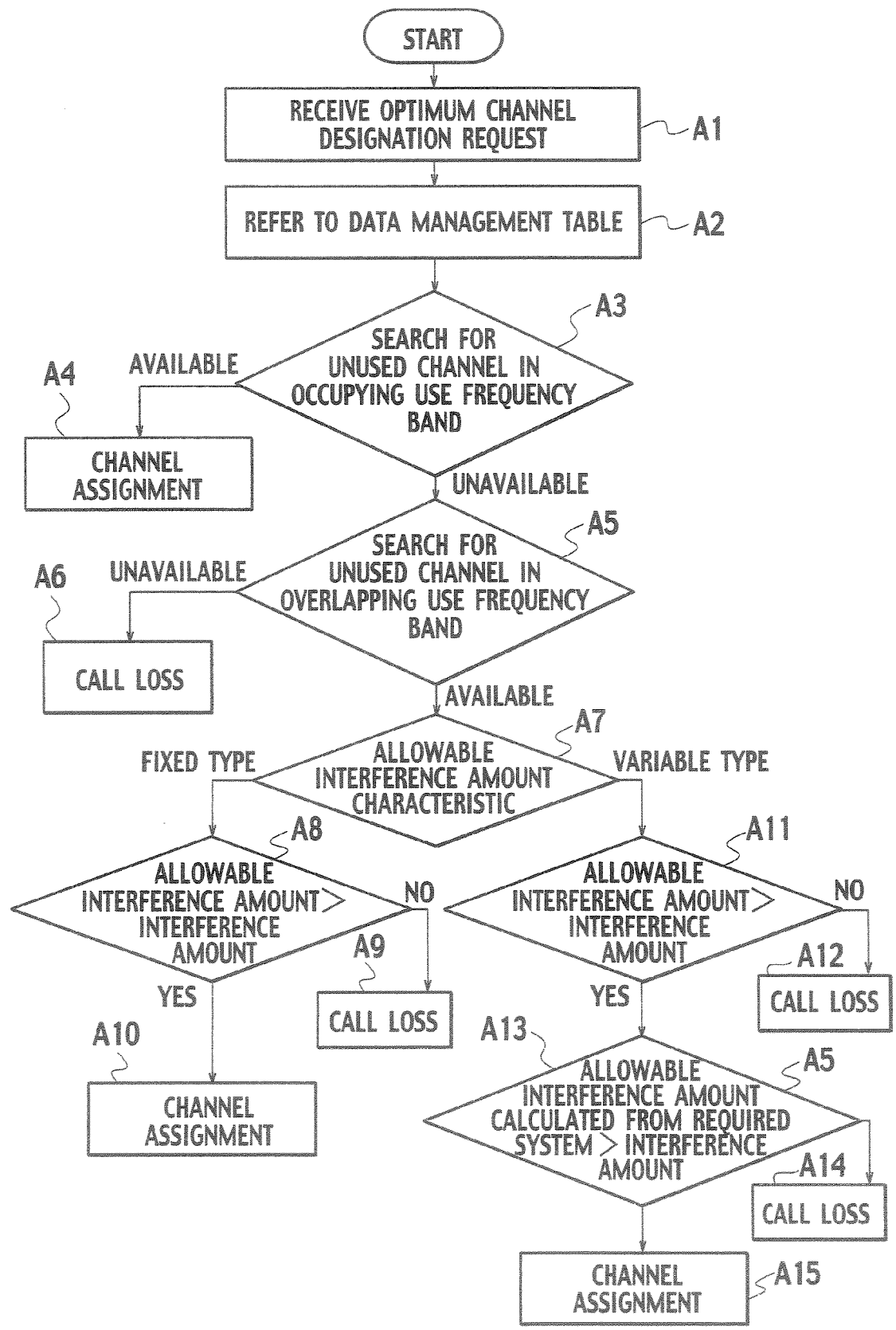
FIG. 14 is a flowchart illustrating the operation of assigning frequency channels in the frequency assignment system according to the embodiment of the present invention.

Next, with reference to FIG. 14, the operation of dynamically assigning frequency channels in the frequency assignment system according to this embodiment will be described.

In step S(A1), when the mobile station apparatus 131 performs call processing the inter-system common control apparatus 31 receives an optimum channel designation request.

In step (A2), the inter-system common control apparatus 31 refers to the "Channel Use Status" and the "Occupying Use/Overlapping Use" in the data management table 317.

In step (A3), the inter-system common control apparatus 31 searches as to whether there is an unused channel in an occupying use frequency band of the radio communications system 1.

In step (A4), when there is an unused channel in the occupying use frequency band of the radio communications system 1, the inter-system common control apparatus 31 assigns the unused channel to the base station apparatus 111 for communication related to the above call processing.

In step (A5), when there is not an unused channel in the occupying use frequency band of the radio communications system 1, the inter-system common control apparatus 31 searches as to whether there is an unused channel in an overlapping use frequency band of the radio communications system 1.

In step (A6), when there is not an unused channel in the overlapping use frequency band of the radio communications system 1, the inter-system common control apparatus 31 decides that call loss processing be performed.

In step (A7), when there is an unused channel in the overlapping use frequency band of the radio communications system 1, the inter-system common control apparatus 31 determines the characteristic of the allowable amount of interference (whether it is of a fixed type in which the allowable amount of interference is fixed or a variable type in which the allowable amount of interference is variable due to a variable spreading ratio or the like) in the radio communications system 2 which is the other party with which the frequency band is used in an overlapping manner.

In step (A8), when the allowable interference amount characteristic in the radio communications system 2 is of the fixed type the inter-system common control apparatus 31 refers to the "Allowable Interference Amount" and the "Interference Amount" associated with the frequency channel in the data management table 317, and compares the "Allowable Interference Amount" and the "Interference Amount" it refers to.

In step (A9), when the "Interference Amount" is larger than or equal to the "Allowable Interference Amount", the inter-system common control apparatus 31 decides that call loss processing be performed.

On the other hand, when the "Interference Amount" is smaller than the "Allowable Interference Amount", in step (A10), the inter-system common control apparatus 31 permits overlapping use of the frequency channel, and assigns the unused channel to the base station apparatus 111 for communication related to the above call processing.

In step (A11), when the allowable interference amount characteristic in the radio communications system 2 is of the variable type, the inter-system common control apparatus 31 refers to the "Allowable Interference Amount" and the "Interference Amount" of the frequency channel in the data management table 317, and compares the "Allowable Interference Amount" and the "Interference Amount" it refers to.

In step (A12), when the "Interference Amount" is larger than or equal to the "Allowable Interference Amount," the inter-system common control apparatus 31 decides that call loss processing be performed.

On the other hand, when the "Interference Amounts" is smaller than the "Allowable Interference Amount", in step (A13), the inter-system common control apparatus 31 also compares an "Allowable Interference Amount" calculated from required system capacity and the "Interference Amount".

In step (A14), when the "Allowable Interference Amount" calculated from the required system capacity is smaller than or equal to the "Interference Amount", the inter-system common control apparatus 31 decides that call loss processing be performed.

In step (A15), when the "Allowable Interference Amount" calculated from the required system capacity is larger than the "Interference Amount", the inter-system common control apparatus 31 permits overlapping use of the frequency channel, and assigns the unused channel to the base station apparatus 111 for communication related to the above call processing.

Here, the "Allowable Interference Amount" calculated from the required system capacity in step (A15) is the upper limit of the allowable amount of interference calculated based on a frequency channel use requirement (such as system capacity, communication speed throughput, or total line capacity) of the radio communications system 2 which is the other party with which the frequency band is used in an overlapping manner.

In contrast the "Allowable Interference Amount" in step (A11) is defined by the "Allowable Interference Amount" of the frequency channel in the data management table 317.

When the allowable interference amount characteristic of the radio communications system 1 is of the variable type, comparison (comparison similar to that in step (A13)) may be performed, using the upper limit of the allowable amount of interference calculated based on a frequency channel use requirement (such as system capacity, communication speed throughput or total line capacity) of the radio communications system 1.

The result of the frequency channel assignment or the result of the call loss processing above is used to update the data management table 317.

Here, a method of estimating the amount of interference with surrounding base station apparatuses in each radio communications system when using a frequency channel in an overlapping manner will be described.

A mobile station apparatus having radio devices communicable with a plurality of radio communications systems can measure a propagation loss from a base station apparatus in each radio communications system to the mobile station apparatus, so as to calculate the amount of interference in a downlink from the base station apparatus.

Thus, by measuring the power of a downlink common control channel (such as a common pilot signal) proper to a radio communications system between a base station apparatus and a mobile station apparatus, the amount of interference with each radio communications system and each cell can be estimated.

Also, since a propagation loss in an uplink between a base station apparatus and a mobile station apparatus is almost equal to a propagation loss in a downlink, the amount of interference in the uplink can also be estimated.

That is, in radio communications systems in which a frequency channel is used in an overlapping manner, a mobile station apparatus can measure propagation losses in downlinks from a plurality of surrounding base station apparatuses, so as to follow the amount of interference varied according to the movement of the mobile station apparatus.

Also, when only one radio device is provided in a mobile station apparatus and the mobile station apparatus can receive only a control signal from a single radio communications system, propagation losses in unlinks from the mobile station apparatus to radio communications systems and surrounding base station apparatuses can be measured to calculate the amounts of interference in the uplinks, thereby to estimate the amounts of interference in downlinks from the propagation losses in the uplinks.

At this time, first, a base station apparatus transmits to the mobile station apparatus a command to transmit a control signal (such as a pilot signal or a training signal) for measuring propagation loss, and each radio communications system and surrounding base station apparatuses receive a control signal transmitted from the mobile station apparatus for measuring. The timing to observe is notified from the base station apparatus via a network through the inter-system common control station apparatus 31 to the surrounding base station apparatuses.

Suppose that each radio communications system and surrounding base station apparatuses can observe control signals from mobile station apparatuses in a plurality of radio communications systems, and use training signals or preambles, or codes in a CDMA system, for identifying the mobile station apparatuses. With information from the base station apparatuses, the mobile station apparatuses can be identified.

Also, since transmission timing can be obtained, the amount of interference can be measured from a difference in the total amount of interference with the control signal. Also, a method can be applied in which the amounts of interference with surrounding base station apparatuses when a mobile station apparatuses sends out a signal in a location of the mobile station apparatus are previously registered with the data management table 317, and the location of the mobile station apparatus is determined to communicate the amounts of interference to the surrounding base station apparatuses.

Figure 15:
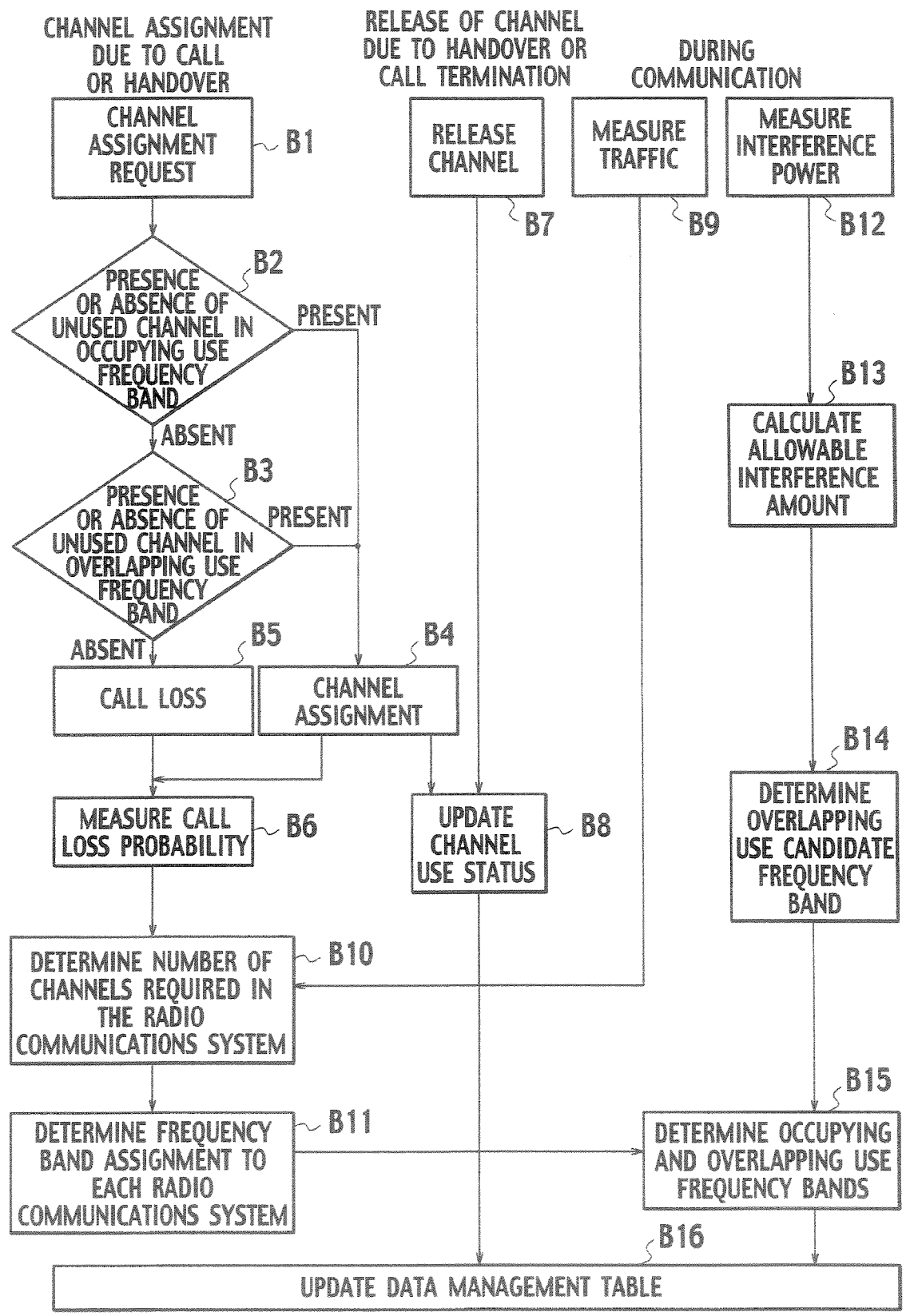
FIG. 15 is a flowchart illustrating the operation of updating the data management table in the frequency assignment system according to the embodiment of the present invention.

Next, with reference to FIG. 15, the operation of updating a data management table in the frequency assignment system according to this embodiment will be described.

In step (B1), the base station apparatus 111 transmits a channel assignment request for requesting assignment of a frequency channel due to call processing or handover.

In step (B2), the inter-system common control apparatus 31 determines whether there is an unused channel in an occupying use frequency band of the radio communications system or not.

In step (B3), when there is not an unused channel in the occupying use frequency band the inter-system common control apparatus 31 determines whether there is an unused channel in an overlapping use frequency band of the radio communications system.

In step (B4), when there is an unused channel in the occupying use frequency band or the overlapping use frequency band of the radio communications system, the inter-system common control apparatus 31 makes the unused channel a frequency channel to be assigned to the channel assignment request.

In step (B5), when there is not an unused channel in the overlapping use frequency band, the inter-system common control apparatus 31 decides that call loss processing be performed.

In step (B6), from the result of assignment processing of a frequency channel in the occupying use frequency band or the overlapping use frequency band of the radio communications system, the control apparatus 141 periodically measures call loss probability in the radio communications system (at each base station apparatus or each cell).

In step (B7), the base station apparatus 111 releases a frequency channel established with the mobile station apparatus 131 due to call termination processing or handover.

In step (B8), the control apparatus 141 calculates the channel use status, based on the result of the frequency channel assignment in step (B4) and the result of the frequency channel release in step (B7), and notifies it to the inter-system common control apparatus 31.

In step (B9), the base station apparatus 111 measures traffic (on each frequency channel) carried during communication with the mobile station apparatus 131.

In step (B10), the control apparatus 141 determines the number of channels required (the number of frequency channels necessary for meeting a required call loss probability) and a required frequency band in the radio communications system, based on the call loss probability in the radio communications system measured in step (B6) and the traffic measured in step (B9).

In step (B11), the inter-system common control apparatus 31 determines frequency bands to be assigned to the radio communications system 1 and the radio communications system 2, based on the numbers of channels required in the radio communications system 1 and the radio communications system 2.

In step (B12), the base station apparatuses 111 and 211 measure the amount of interference on every frequency channel used during communication with the mobile station apparatuses 131 and 231. The amount of interference on a frequency channel includes the amount of interference from an adjacent frequency channel, in addition to the amount of interference from the same frequency channel.

In step (B13), the inter-system common control apparatus 31 calculates the allowable amount of interference on every frequency channel used by the base station apparatuses 111 and 211, based on the amounts of interference measured in step (B12).

In step (B14), the inter-system common control apparatus 31 determines a candidate frequency band for overlapping use, based on the allowable amounts of interference calculated in step (B13).

In step (B15), the inter-system common control apparatus 31 determines occupying and overlapping use frequency bands for each frequency band, based on the assigned frequency bands determined in step (B11) and the candidate frequency band for overlapping use determined in step (B14).

In step (B16), the inter-system common control apparatus 31 updates the data management table 317, based on the channel use status updated in step (B8), and the occupying and overlapping use frequency bands determined in step (B15), respectively.

According to the frequency assignment system of this embodiment, as shown in FIGS. 16(*a*) and 16(*b*), sharing of a frequency band by a plurality of different radio communications systems can be implemented.

At this time, depending on the frequency band sharing state, or traffic or the type of traffic frequency band assignment control in which an occupying use frequency band of each radio communications system and an overlapping use frequency band are mixed as shown in FIG. 16(*a*) or frequency band assignment control in which the entire frequency band is made to be an overlapping use frequency band as shown in FIG. 16(*b*) can be performed.

In the frequency assignment system according to this embodiment, assumed is the case where a wideband CDMA radio communications system and a narrowband TDMA radio communications system which have different characteristics to interference and use different frequency bandwidths coexist in the same frequency band. The present invention however can also be applied to the case where radio communications systems having equal characteristics to interference coexist, or three or more radio communications systems coexist.

According to the frequency assignment system of this embodiment, significantly flexible frequency band assignment control is possible, increasing frequency band use efficiency. Also, according to the frequency assignment system of this embodiment, flexible frequency band assignment control can be easily implemented, according to the required number of channels based on traffic, and the amount of interference between a plurality of radio communications systems, and effective frequency band assignment control can be implemented for uneven traffic distribution.

Also, according to the frequency assignment system of this embodiment, in a plurality of radio communications systems using a common frequency band, a frequency channel assignment system, base stations, control stations, an inter-system common control apparatus and a frequency channel assignment method which allow adaptive overlapping use of the same frequency band by different radio communications systems can be implemented, based on the allowable amount of interference in each radio communications system or on each frequency channel, taking account of the frequency channel status in each radio communications system or at each base station apparatus and the required number of frequency channels determined according to traffic in each radio communications system.

(Modification 1)

Figure 17:
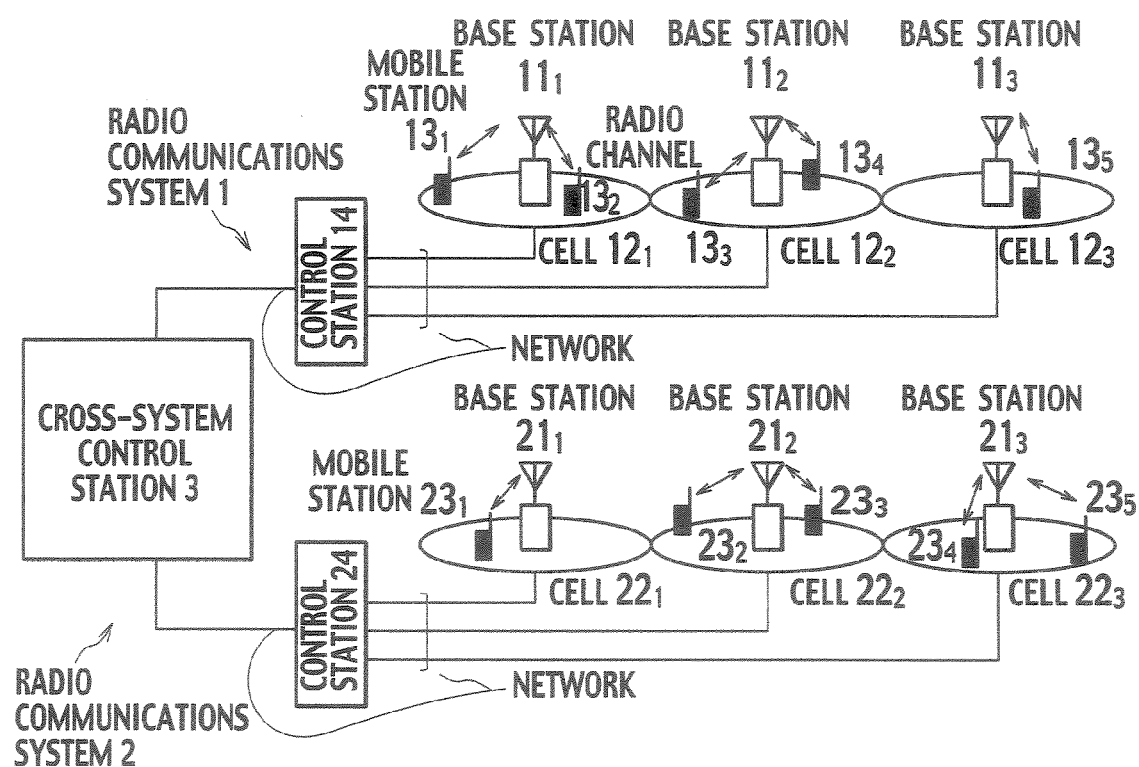
FIG. 17 is a network configuration diagram of a frequency assignment system according to modification 1 of the present invention.
Figure 18:
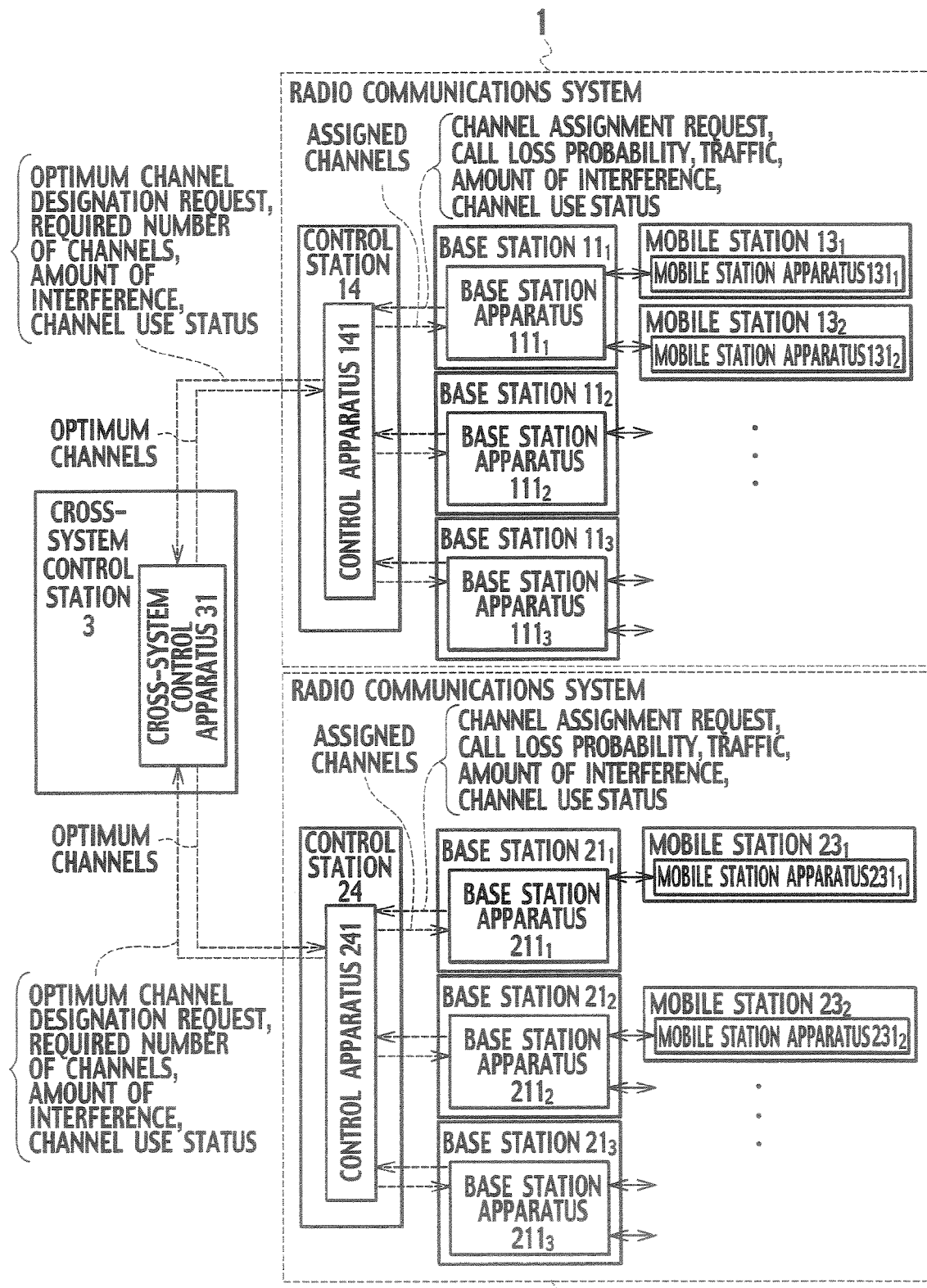
FIG. 18 is a functional block diagram of the frequency assignment system according to the modification 1 of the present invention.

With reference to FIGS. 17 and 18, a frequency channel assignment system according to modification 1 will be described.

As shown in FIG. 17, the frequency channel assignment system according to the modification 1 includes a plurality of mobile stations $13_1$ to $13_5$ and $23_1$ to $23_5$, a plurality of base stations $11_1$ to $11_3$ and $21_1$ to $21_3$, control stations 14 and 24 for controlling the base stations $11_1$ to $11_3$ and $21_1$ to $21_3$, and a inter-system common control station 3.

As shown in FIG. 17, the inter-system common control station 3 is connected to the control stations 14 and 24 via networks, and the control stations 14 and 24 are connected to the base stations $11_1$ to $11_3$ and $21_1$ to $21_3$ via networks, and the base stations $11_1$ to $11_3$ and $21_1$ to $21_3$ are connected to the mobile stations $13_1$ to $13_5$ and $23_1$ to $23_5$ located in cells $12_1$ to $12_3$ and $22_1$ to $22_3$ via radio channels.

In the modification 1, the inter-system common control station 3 has the function of determining frequency bands for communication between the base stations $13_1$ to $13_5$ and $23_1$ to $23_5$ and the mobile stations $13_1$ to $13_5$ and $23_1$ to $23_5$ belonging to their respective radio communications systems avoiding mutual interference between different radio communications systems, based on channel status information notified from the control stations 14 and 24 (such as the numbers of channels required, the amounts of interference and the channel use status at the base stations 11 notified from the control station 14), and making the control stations 14 and 24 perform frequency channel assignment control.

FIG. 18 shows the network connection structure of apparatuses of radio stations (mobile stations, base stations, control stations, a inter-system common control station) in radio communications systems shown in FIG. 17.

The mobile stations $13_1$ to $13_5$ and $23_1$ to $23_5$ are provided with mobile station apparatuses 131 and 231 configured to transmit channel assignment requests for requesting frequency channel assignment to perform communication with the base stations $13_1$ to $13_5$ and $23_1$ to $23_5$. The mobile station apparatuses $131_1$ to $131_5$ and $231_1$ to $231_5$ perform communication using frequency channels designated by the base stations $13_1$ to $13_5$ and $23_1$ to $23_5$.

The base stations $11_1$ to $11_3$ and $21_1$ to $21_3$ include base station apparatuses $111_1$ to $111_3$ and $211_1$ to $211_3$. The base station apparatuses $111_1$ to $111_3$ and $211_1$ to $211_3$ accept channel assignment requests by the mobile station apparatuses $131_1$ to $131_5$ and $231_1$ to $231_5$ request the control stations 14 and 24 to which the base stations $11_1$ to $11_3$ and $21_1$ to $21_3$ belong to assign frequency channels for performing radio communication with the mobile stations $13_1$ to $13_5$ and $23_1$ to $23_5$ belonging to the base stations $11_1$ to $11_3$ and $21_1$ to $21_3$, receive information on frequency channels assigned by the control stations 14 and 24, and perform communication with the mobile station apparatuses $131_1$ to $131_5$ and $231_1$ to $231_5$ using frequency channels designated based on the frequency channel information.

Also, the base station apparatuses $111_1$ to $111_3$ and $211_1$ to $211_3$ measure the amount of interference, call loss probability, traffic and channel use status on each frequency channel during communication, and notify them to the control stations 14 and 24.

The control stations 14 and 24 include control apparatuses 141 and 241. The control apparatuses 141 and 241 accept channel assignment requests by the base station apparatuses $111_1$ to $111_3$ and $211_1$ to $211_3$, transmit optimum channel designation requests for requesting the inter-system common control station 3 to assign optimum channels to be assigned to the base station apparatuses $111_1$ to $111_3$ and $211_1$ to $211_3$ of the base stations $11_1$ to $11_3$ and $21_1$ to $21_3$ belonging to the control stations 14 and 24, accept information on optimum channels assigned by the inter-system common control station 3, and control frequency channel assignment to the mobile station apparatuses $131_1$ to $131_5$ and $231_1$ to $231_5$ by the base station apparatuses $111_1$ to $111_3$ and $211_1$ to $211_3$ based on the optimum channel information.

Also, the control apparatuses 141 and 241 accept the amounts of interference, call loss probabilities, traffic and the channel use status notified from the base station apparatuses $111_1$ to $111_3$ and $211_1$ to $211_3$, calculate the numbers of channels required at the base stations $11_1$ to $11_3$ and $21_1$ to $21_3$ and the mobile stations $13_1$ to $13_5$ and $23_1$ to $23_5$ belonging to the control stations 14 and 24, based on those pieces of information, and notify them with the amounts of interference and the channel use status to the inter-system common control station 3.

The inter-system common control station 3 include an inter-system common control apparatus 31. The inter-system common control apparatus 31 accepts channel assignment requests by the control apparatuses 141 and 241, and manages channel status information (such as the channel use status and the amounts of interference) and the required numbers of channels notified from the control apparatuses 141 and 241 and system characteristics information (such as frequency bandwidths per carrier, the allowable amounts of interference and priorities), for each frequency band, each radio communications system and each cell, for example.

The inter-system common control apparatus 31 determines frequency bands or frequency channels for the base stations $11_1$ to $11_3$ and $21_1$ to $21_3$ and the mobile stations $13_1$ to $13_5$ and $23_1$ to $23_5$ belonging to the radio communications systems 1 and 2, respectively, to notify, avoiding interference from different radio communications systems, using a common frequency band assigned to the radio communications systems 1 and 2, and notifies the determined frequency channels to the control apparatuses 141 and 241.

As described above, the control apparatuses 14 and 24 have the function of notifying frequency channels assigned by the inter-system common control apparatus 31 to the base stations $11_1$ to $11_3$ and $21_1$ to $21_3$, the function of collecting channel status information showing the status of frequency channels at the base stations $11_1$ to $11_3$ and $21_1$ to $21_3$, the function of calculating the numbers of channels required at the base stations $11_1$ to $11_3$ and $21_1$ to $21_3$, based on the collected channel status information, and the function of notifying the channel status information and the required numbers of channels to the inter-system common control apparatus 31.

The inter-system common control apparatus 31 also has the function of managing system characteristics information showing the characteristics of frequency channels in the radio communications systems 1 and 2, the function of assigning frequency channels to the radio communications systems 1 and 2, based on the system characteristics information it manages and the channel status information and the required channel numbers notified from the control stations 14 and 24, and the function of notifying the assigned frequency channels to the control stations 14 and 24 in the radio communications systems 1 and 2.

The plurality of control stations 14 and 24 assign frequency channels for radio communication between the base stations $11_1$ to $11_3$ and $21_1$ to $21_3$ and the mobile stations $13_1$ to $13_5$ and $23_1$ to $23_5$ collect channel status information at the base stations $11_1$ to $11_3$ and $21_1$ to $21_3$, and calculate the required numbers of channels based on the channel status information. The collected channel status information and the required numbers of channels are notified to the control stations 14 and 24 to which the base stations $11_1$ to $11_3$ and $21_1$ to $21_3$ belong.

The intersystem common control station 3 is connected to the control stations 14 and 24 in the different radio communications systems 1 and 2. Specifically the inter-system common control station 3 can determine frequency bands or frequency channels available for the radio communications systems 1 and 2, based on the channel status information and the numbers of channels required at the base stations $11_1$ to $11_3$ and $21_1$ to $21_3$ notified from the control stations 14 and 24, so as to avoid mutual interference between the different radio communications systems 1 and 2.

The plurality of control stations 14 and 24 have the function of assigning frequency channels for the base stations $11_1$ to $11_3$ and $21_1$ to $21_3$ and the mobile stations $13_1$ to $13_5$ and $23_1$ to $23_5$ to perform radio communication, the function of collecting call loss probabilities and traffic at the base stations $11_1$ to $11_3$ and $21_1$ to $21_3$, the function of calculating the required numbers of channels, based on the call loss probabilities and the traffic, and the function of notifying the required numbers of channels to the control stations 14 and 24 to which the base stations $11_1$ to $11_3$ and $21_1$ to $21_3$ belong.

Also, the intersystem common control station 3 has the function of collecting channel status information and the numbers of channels required at the base stations $11_1$ to $11_3$ and $21_1$ to $21_3$ notified from the control stations 14 and 24, the function of managing the channel status information and the required numbers of channels it collects and system characteristics information (such as frequency bandwidths per carrier, allowable amounts of interference and priorities), and sharing them between the different radio communications systems 1 and 2, and the function of determining frequency bands or frequency channels for the base stations $11_1$ to $11_3$ and $21_1$ to $21_3$ and the mobile stations $13_1$ to $13_5$ and $23_1$ to $23_5$ belonging to the radio communications systems 1 and 2, respectively, to perform radio communication, referring to the information shared between the different radio communications systems 1 and 2, thereby avoiding deterioration in communication quality due to mutual interference between the different radio communications systems 1 and 2, and performing control of frequency channel assignment at the control stations 14 and 24.

(Modification 2)

Figure 19:
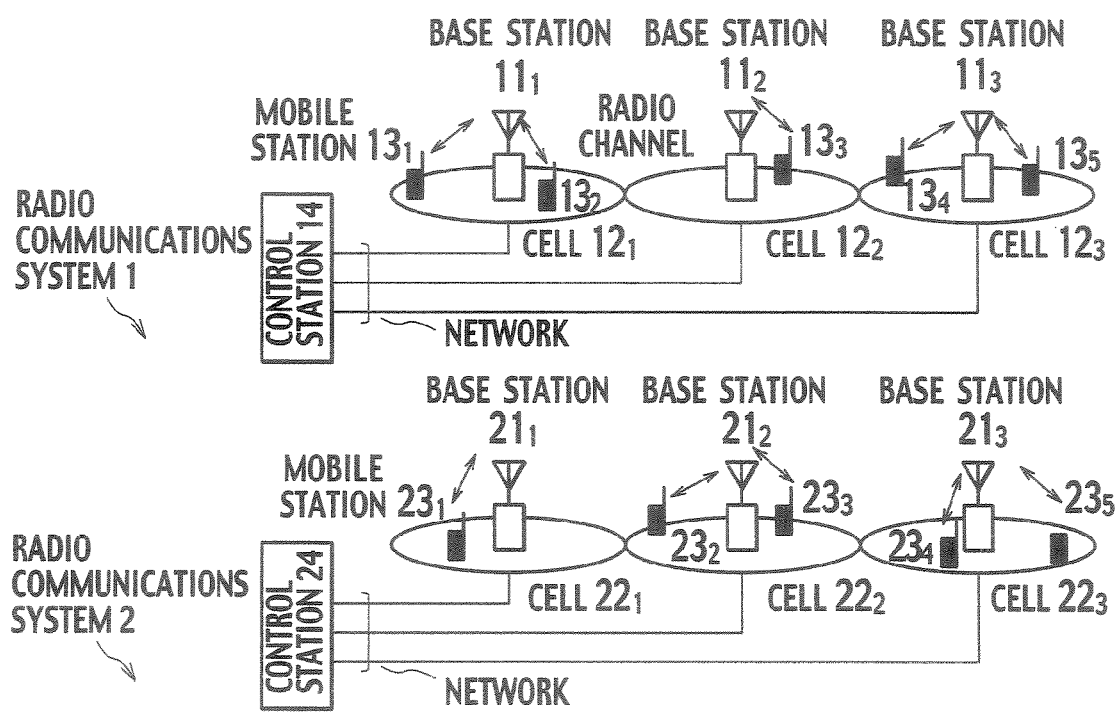
FIG. 19 is a network configuration diagram of a frequency assignment system according to modification 2 of the present invention.
Figure 20:
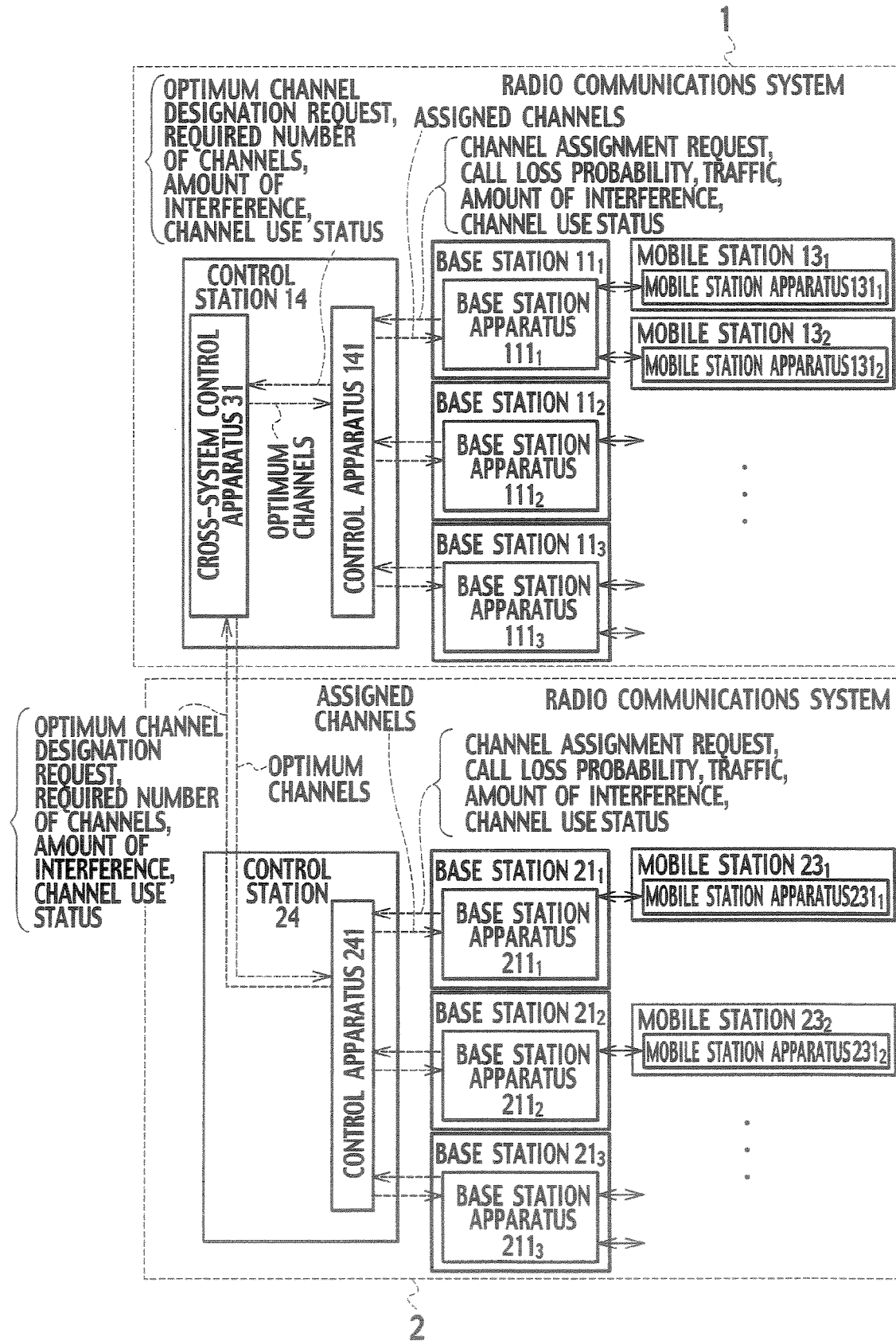
FIG. 20 is a functional block diagram of the frequency assignment system according to the modification 2 of the present invention.

With reference to FIGS. 19 and 20, a frequency channel assignment system according to modification 2 will be described.

As shown in FIG. 19, the frequency channel assignment system according to the modification 2 is configured such that radio communications systems 1 and 2 are controlled under management of control stations 14 and 24 which manage a plurality of base stations $11_1$ to $11_3$ and $21_1$ to $21_3$ without a intersystem common control station 3.

In this case, at least one of the control stations 14 and 24 managing the base stations $11_1$ to $11_3$ and $21_1$ to $21_3$ includes an inter-system common control apparatus 31. The inter-system common control apparatus 31 is connected to other control apparatuses 141 and 241 to share information, so that the radio communications system 1 and the radio communications system 2 are unified.

The inter-system common control apparatus 31 is configured to determine frequency bands or frequency channels, based on information (such as the required numbers of channels the amounts of interference and the channel use status) obtained from the control apparatuses 141 and 241 in the control stations 14 and 24 via networks using a common frequency band assigned to the radio communications systems 1 and 2, and avoiding mutual interference between the different radio communications systems 1 and 2 for the base stations $11_1$ to $11_3$ and $21_1$ to $21_3$ and mobile stations $13_1$ to $13_5$ and $23_1$ to $23_5$ belonging to the radio communications systems 1 and 2 to perform communication.

FIG. 20 shows the network connection structure of apparatuses provided in radio stations in the radio communications systems shown in FIG. 19.

The mobile stations $13_1$ to $13_5$ and $23_1$ to $23_5$ include mobile station apparatuses $131_1$ to $131_5$ and $231_1$ to $231_5$ for transmitting channel assignment requests for requesting assignment of frequency channels for radio communication with the base stations $11_1$ to $11_3$ and $21_1$ to $21_3$. The mobile station apparatuses $131_1$ to $131_5$ and $231_1$ to $231_5$ perform communication using frequency channels designated by the base stations $11_1$ to $11_3$ and $21_1$ to $21_3$.

The base stations $11_1$ to $11_3$ and $21_1$ to $21_3$ include base station apparatuses $111_1$ to $111_3$ and $211_1$ to $211_3$. The base station apparatuses $111_1$ to $111_3$ and $211_1$ to $211_3$ accept channel assignment requests from the mobile station apparatuses $131_1$ to $131_5$ and $231_1$ to $231_5$, and request the control stations 14 and 24 to which the base stations $11_1$ to $11_3$ and $21_1$ to $21_3$ belong to assign frequency channels for communication with the mobile stations $13_1$ to $13_5$ and $23_1$ to $23_5$ belonging to the base stations $11_1$ to $11_3$ and $21_1$ to $21_3$ and accept information on frequency channels assigned from the control stations 14 and 24, and perform frequency channel assignment for communication with the mobile station apparatuses $131_1$ to $131_5$ and $231_1$ to $231_5$, using frequency channels designated based on the frequency channel information.

The base station apparatuses $111_1$ to $111_3$ and $211_1$ to $211_3$ measure the amount of interference, call loss probability, traffic, channel use status, and the like on each frequency channel during communication and notify them to the control stations 14 and 24.

The control stations 14 and 24 include the control apparatuses 141 and 241. The control stations 14 or 24 in at least one radio communications system of a plurality of radio communications systems located in the same region and using the same frequency band includes the inter-system common control apparatus 31.

In the example of FIG. 20, when the radio communications system 1 and the radio communications system 2 are located in the same region, using the same frequency band, only the control station 14 in the radio communications system 1 include the inter-system common control apparatus 31.

The control apparatuses 141 and 241 accept channel assignment requests by the base station apparatuses $111_1$ to $111_3$ and $211_1$ to $211_3$; request the inter-system common control apparatus 31 to assign optimum frequency channels to be assigned to the base station apparatuses $111_1$ to $111_3$ and $211_1$ to $211_3$ of the base stations $11_1$ to $11_3$ and $21_1$ to $21_3$ belonging to the control stations 14 and 24, accept information on optimum channels assigned by the inter-system common control apparatus 31, and control frequency channel assignment to the mobile station apparatuses $131_1$ to $131_5$ and $231_1$ to $231_5$ by the base station apparatuses $111_1$ to $111_3$ and $211_1$ to $211_3$, based on the optimum channel information.

Also, the control apparatuses 141 and 241 accept call loss probabilities and traffic notified from the base station apparatuses $111_1$ to $111_3$ and $211_1$ to $211_3$, calculate the numbers of channels required between the base stations $11_1$ to $11_3$ and $21_1$ to $21_3$ and the mobile stations $13_1$ to $13_5$ and $23_1$ to $23_5$ belonging to the control stations 14 and 24, based on the information, and notify them with channel status information to the inter-system common control apparatus 31.

The inter-system common control apparatus 31 accepts optimum channel designation requests from the control apparatuses 141 and 241, and manages channel status information and the required numbers of channels notified from the control apparatuses 141 and 241 and system characteristics information for each frequency band, each radio communications system, and each cell, for example.

The inter-system common control apparatus 31 determines frequency bands or frequency channels using a common frequency band assigned to the radio communications systems 1 and 2, and avoiding mutual interference between different radio communications systems, for the base stations $11_1$ to $11_3$ and $21_1$ to $21_3$ and the mobile stations $13_1$ to $13_5$ and $23_1$ to $23_5$ belonging to the radio communications systems 1 and 2, respectively, to communicate and informs the determined optimum channels to the control apparatuses 141 and 241.

The inter-system common control apparatus 31 shares information with the other control apparatuses 141 and 241 in the radio communications systems, and an inter-system common control apparatus 31 provided in the other control station 141 via networks.

(Modification 3)

Figure 21:
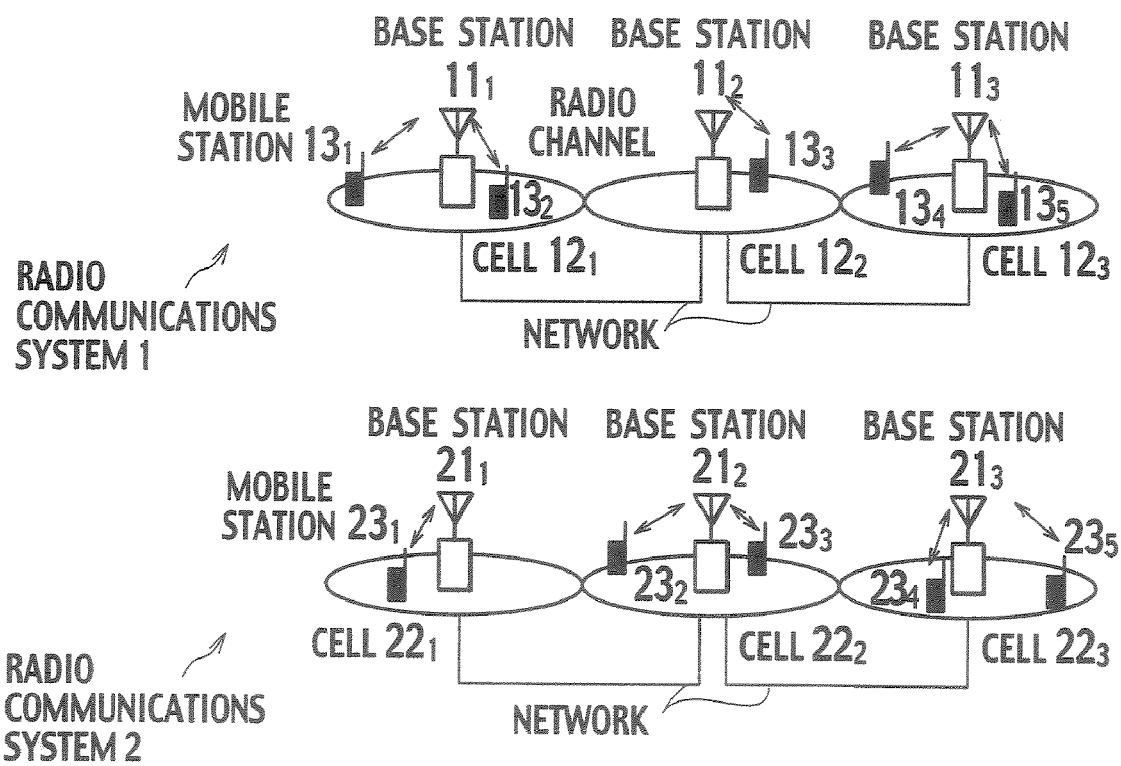
FIG. 21 is a network configuration diagram of a frequency assignment system according to modification 3 of the present invention.
Figure 22:
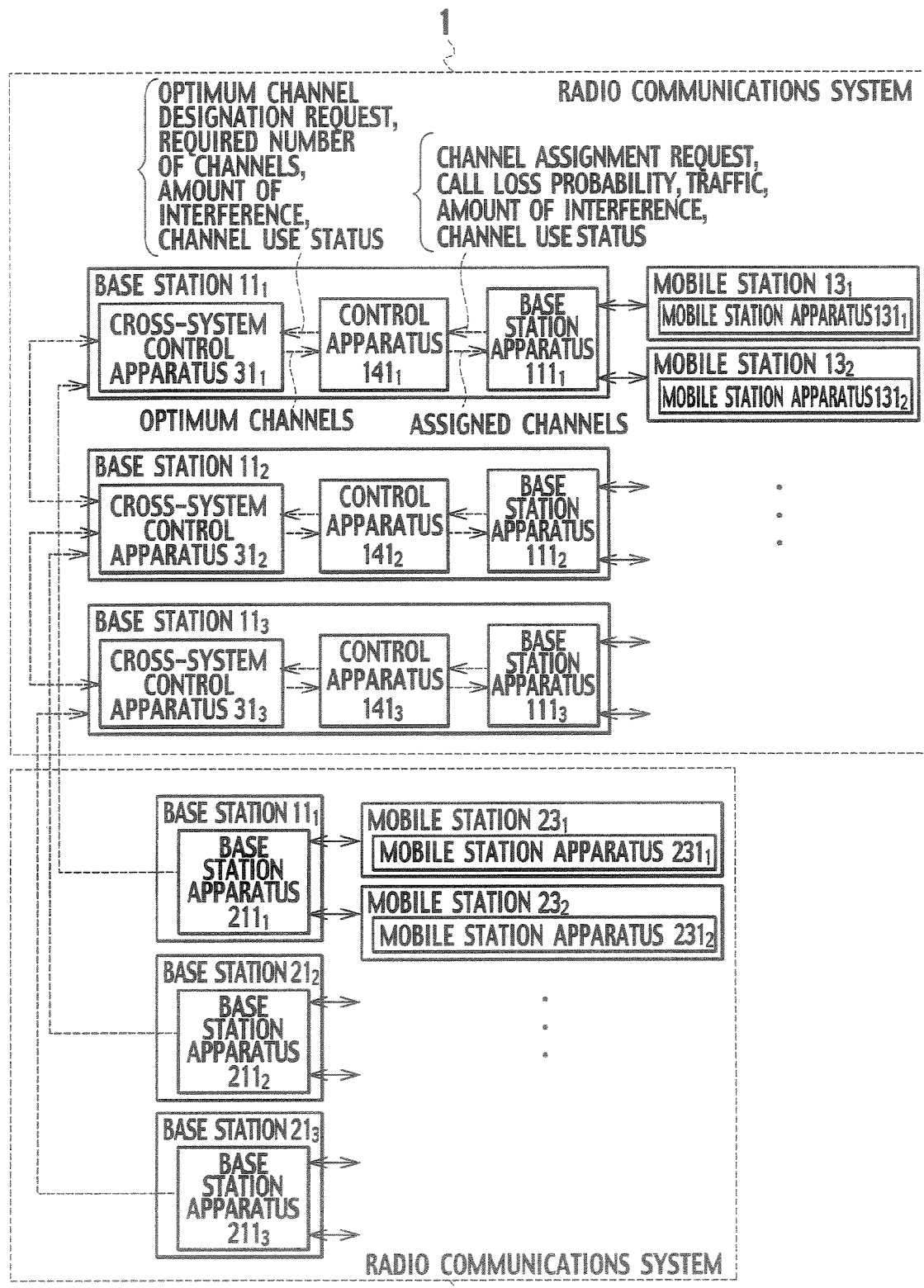
FIG. 22 is a functional block diagram of the frequency assignment system according to the modification 3 of the present invention.

With reference to FIGS. 21 and 22, a frequency channel assignment system according to modification 3 will be described.

As shown in FIG. 21 the frequency assignment system according to this embodiment is configured such that radio communications systems 1 and 2 manage and control frequency bands and frequency channels for use by negotiations between base stations, without a inter-system common control station 3 and control stations 14 and 24.

In the frequency assignment system according to this embodiment, base stations $11_1$ to $11_3$ in at least one radio communications system of a plurality of radio communications systems located in the same region, using the same frequency band include inter-system common control apparatuses $31_1$ to $31_3$ and control apparatuses $141_1$ to $141_3$, respectively.

The inter-system common control apparatuses 31 are connected to the inter-system common control apparatuses 31 in other base stations 11 and base station apparatuses 211 of base stations 21 in another radio communications system to share information, so that the radio communications system 1 and the radio communications system 2 are unified.

In the frequency assignment system according to this embodiment, the inter-system common control apparatuses $31_1$ to $31_3$ determine frequency bands or frequency channels, based on information held by the base stations 11 and obtained via networks, using a common frequency band assigned to the radio communications systems 1 and 2, and avoiding mutual interference between different radio communications systems, for the base stations $11_1$ to $11_3$ and $21_1$ to $21_3$ and the mobile stations $13_1$ to $13_5$ and $23_1$ to $23_5$ belonging to their respective radio communications systems to communicate.

FIG. 22 shows the network connection structure of apparatuses provided in radio stations in radio communications systems shown in FIG. 21.

The mobile stations $13_1$ to $13_5$ and $23_1$ to $23_5$ include mobile station apparatuses $131_1$ to $131_5$ and $231_1$ to $231_5$ which transmit channel assignment requests for requesting assignment of frequency channels for communication with the base stations $11_1$ to $11_3$ and $21_1$ to $21_3$. The mobile station apparatuses $131_1$ to $131_5$ and $231_1$ to $231_5$ perform communication, using frequency channels designated by the base stations $11_1$ to $11_3$ and $21_1$ to $21_3$.

The base stations $11_1$ to $11_3$ and $21_1$ to $21_3$ include base station apparatuses $111_1$ to $111_3$ and $211_1$ to $211_3$. At least one radio communications system of a plurality of radio communications systems located in the same region, using the same frequency band includes the control apparatuses $141_1$ to $141_3$ and the inter-system common control apparatuses $31_1$ to $31_3$ in the base stations $11_1$ to $11_3$ or $21_1$ to $21_3$.

In the example of FIG. 22 where the radio communications system 1 and the radio communications system 2 are located in the same region, using the same frequency band only the base stations $111_1$ to $111_3$ in the radio communications system 1 includes the control apparatuses $141_1$ to $141_3$ and the inter-system common control apparatuses $31_1$ to $31_3$.

The base station apparatuses $111_1$ to $111_3$ and $211_1$ to $211_3$ accept channel assignment requests from the mobile station apparatuses $131_1$ to $131_5$ and $231_1$ to $231_5$, request assignment of frequency channels for communication with the mobile stations $131_1$ to $131_5$ and $231_1$ to $231_5$ belonging to the base stations $111_1$ to $111_3$ and $211_1$ to $211_3$ accept information on frequency channels assigned from the control apparatuses 141, and perform frequency channel assignment for communication with the mobile station apparatuses $131_1$ to $131_5$ and $231_1$ to $231_5$, using designated frequency channels, based on the frequency channel information.

Also, the base station apparatuses $111_1$ to $111_3$ and $211_1$ to $211_3$ measure the amount of interference on each frequency channel, channel use status, and the like during communication, and notify them to the control apparatuses 141.

The control apparatuses 141 accept channel assignment requests from the base station apparatuses $111_1$ to $111_3$ and $211_1$ to $211_3$ transmit to the inter-system common control apparatuses 31 requests for optimum channel designation to the base station apparatuses $111_1$ to $111_3$ and $211_1$ to $211_3$ of the base stations $11_1$ to $11_3$ and $21_1$ to $21_3$, accept information on optimum channels assigned from the inter-system common control apparatuses 31, and control frequency channel assignment to the mobile station apparatuses $131_1$ to $131_5$ and $231_1$ to $231_5$ by the base station apparatuses $111_1$ to $111_3$ and $211_1$ to $211_3$, based on the optimum channel information.

The control apparatuses 141 accept call loss probabilities and traffic notified from the base station apparatuses $111_1$ to $111_3$ and $211_1$ to $211_3$, calculate the numbers of channels required at the base stations $11_1$ to $11_3$ and $21_1$ to $21_3$ and the mobile stations $13_1$ to $13_5$ and $23_1$ to $23_5$ belonging to the control stations 14 and 24, based on the information, and notify them with channel status information to the inter-system common control apparatuses 31.

The inter-system common control apparatuses 31 accept optimum channel designation requests by the control apparatuses 141 and 241, and manage channel status information and the required numbers of channels notified from the control apparatuses 141 and 241 and system characteristics information for each frequency band, each radio communications system, and each cell, for example.

The inter-system common control apparatuses 31 determine frequency bands or frequency channels, using a common frequency band assigned to the radio communications systems 1 and 2, and avoiding mutual interference between different radio communications systems, for the base stations $11_1$ to $11_3$ and $21_1$ to $21_3$ and the mobile stations $13_1$ to $13_5$ and $23_1$ to $23_5$ belonging to the radio communications systems 1 and 2, respectively, to communicate, and informs the determined frequency bands or frequency channels to the control apparatuses 141 and 241.

The inter-system common control apparatuses 31 share information with the other control apparatuses 141 and 241 in the radio communications system and the intersystem common control apparatuses 31 provided in other base stations 11 via networks.

While the present invention has been described in detail with the embodiments above, it is obvious to those skilled in the art that the present invention is not limited to the embodiments described in this specification. Apparatuses in the present invention can be implemented with alterations and modifications without departing from the spirit and scope of the present invention as defined by the description of the claims. Thus, the description in this application is for illustrative purposes and is not meant to limit the present invention.

INDUSTRIAL APPLICABILITY

As described above, according to the present invent on frequency channel assignment systems, base stations, control stations, inter-system common control apparatuses, frequency channel assignment methods and control methods which enable adaptive overlapping use of the same frequency band in a plurality of radio communications systems can be implemented.

The invention claimed is:
1. A frequency channel assignment system comprising a plurality of radio communications systems which use a common frequency band in a common geographical area, and a controller, the controller comprising:

a system characteristics information management function configured to manage system characteristics information showing characteristics of frequency channels in the radio communications systems, the system characteristics information including, for each frequency channel, an allowable amount of interference on the frequency channel;

a frequency channel assignment function configured to assign the frequency channels to each of the radio communications systems, based on the system characteristics information and channel status information showing status of the frequency channels, so as to avoid inter-system interference, the channel status information including, for each frequency channel, an interference measurement of the frequency channel;

the controller determining, within a range of the common frequency band and based on the system characteristics information and the channel status information:

a first occupied use frequency band which includes first frequency channels available only to a first radio communications system, a second occupied use frequency band which includes second frequency channels available only to a second radio communications system, and an overlapping use frequency band which includes third frequency channels available to the first and second radio communications system; and the frequency channel assignment function, when the first occupied use frequency band is lower than the second occupied use frequency band, prioritizes a frequency channel of a low frequency band in the first radio communication system and prioritizes a frequency channel of a high frequency band in the second radio communication system.

2. The frequency channel assignment system as set forth in claim 1, the controller further comprising:

a required frequency channel calculation function configured to calculate the number of frequency channels required at a base station, based on at least one of call loss probability and traffic at the base station, wherein the frequency channel assignment function is configured to assign the frequency channels to each of the radio communications systems, based on the system characteristics information, the channel status information, and the required number of frequency channels, so as to avoid inter-system interference.

3. The frequency channel assignment system as set forth in claim 2, the controller further comprising:

a control apparatus provided in each of the plurality of radio communications systems, and an inter-system common control apparatus connected to the plurality of radio communications systems, the control apparatus comprising:
  a function of collecting the channel status information;
  a function of calculating the required number of frequency channels; and
  a notification function configured to notify the required number of frequency channels and the channel status information to the inter-system common control apparatus; and the inter-system common control apparatus comprising:
  a function of managing the system characteristics information;
  a function of assigning the frequency channels; and
  a frequency channel notification function configured to notify the assigned frequency channels to each of the control apparatuses.

4. The frequency channel assignment system as set forth in claim 3, wherein the inter-system common control apparatus is provided in a control station in a given radio communications system of the plurality of radio communications systems.

5. The frequency channel assignment system as set forth in claim 1, wherein, as the system characteristics information, at least one of overlapping use possibility on the frequency channels, priority of assigning the frequency channels, and frequency bandwidth used on the frequency channels is used.

6. The frequency channel assignment system as set forth in claim 1, wherein, as the channel status information, at least one of use status of the frequency channels, and radio path change on the frequency channels is used.

7. A base station for performing radio communication with mobile stations, using frequency channels in radio communications systems in a common frequency band in a common geographical area, comprising:

a channel status information collection function configured to collect channel status information showing status of frequency channels at the base station, the channel status information including, for each frequency channel, an interference measurement of the frequency channel;

a system characteristics information management function configured to manage system characteristics information showing characteristics of frequency channels in the radio communications systems, the system characteristics information including, for each frequency channel, an allowable amount of interference on the frequency channel; and a frequency channel selection function configured to select frequency channels for use between the base station and the mobile stations, based on the system characteristics information and the channel status information;

the base station determining, within a range of the common frequency band and based on the system characteristics information and the channel status information:

a first occupied use frequency band which includes first frequency channels available only to a first radio communications system, a second occupied use frequency band which includes second frequency channels available only to a second radio communications system, and an overlapping use frequency band which includes third frequency channels available to the first and second radio communications systems; and the frequency channel selection function, when the first occupied use frequency band is lower than the second occupied use frequency band, prioritizes a frequency channel of a low frequency band in the first radio communication system and prioritizes a frequency channel of a high frequency band in the second radio communication system.

8. The base station as set forth in claim 7, further comprising:

a measurement function configured to measure at least one of call loss probability and traffic at the base station; and a required frequency channel number calculation function configured to calculate the number of frequency channels required at the base station, based on at least one of the call loss probability and the traffic at the base station, wherein the frequency channel selection function is configured to select frequency channels for use between the base station and the mobile stations, based on the system characteristics information, the channel status information, and the required number of frequency channels.

9. A control station for controlling a plurality of base stations in radio communications systems using a common frequency band in a common geographical area, comprising:
a channel status information collection function configured to collect channel status information showing status of frequency channels at each of the base stations, the channel status information including, for each frequency channel, an interference measurement of the frequency channel; and
a required frequency channel number calculation function configured to calculate a number of frequency channels required at the base stations, based on at least one of call loss probability and traffic at the base stations;
the control station is configured to select frequency channels for use between the base stations and mobile stations, based on system characteristics information, the channel status information, and the required numbers of frequency channels, the system characteristics information including, for each frequency channel, an allowable amount of interference on the frequency channel;
the control station determines, within a range of the common frequency band and based on the system characteristics information and the channel status information:
a first occupied use frequency band which includes first frequency channels available only to a first radio communications system,
a second occupied use frequency band which includes second frequency channels available only to a second radio communications system, and
an overlapping use frequency band which includes third frequency channels available to the first and second radio communications systems; and
the control station selects frequency channels, when the first occupied use frequency band is lower than the second occupied use frequency band, by prioritizing a frequency channel of a low frequency band in the first radio communication system and prioritizing a frequency channel of a high frequency band in the second radio communication system.

10. An inter-system common control apparatus connected to a plurality of radio communications systems using a common frequency band in a common geographical area, comprising:
a system characteristics information management function configured to manage system characteristics information showing characteristics of frequency channels in the radio communications systems, the system characteristics information including, for each frequency channel, an allowable amount of interference on the frequency channel;
a collection function configured to collect channel status information showing status of frequency channels at base stations in the radio communications systems, and the numbers of frequency channels required at the base stations, from control stations in the radio communications systems, the channel status information including, for each frequency channel, an interference measurement of the frequency channel;
a frequency channel assignment function configured to assign frequency channels to each of the radio communications systems, based on the managed system characteristics information, and the channel status information and the required numbers of frequency channels notified from the control stations;
a frequency channel communication function configured to notify the assigned frequency channels to the control stations in the radio communications systems;

the control apparatus determines, within a range of the common frequency band and based on the system characteristics information and the channel status information:
a first occupied use frequency band which includes first frequency channels available only to a first radio communications system,
a second occupied use frequency band which includes second frequency channels available only to a second radio communications system, and
an overlapping use frequency band which includes third frequency channels available to the first and second radio communications systems; and
the frequency channel assignment function, when the first occupied use frequency band is lower than the second occupied use frequency band, prioritizes a frequency channel of a low frequency band in the first radio communication system and prioritizes a frequency channel of a high frequency band in the second radio communication system.

11. The inter-system common control apparatus as set forth in claim 10, wherein, for each frequency channel available at the base stations in the radio communications systems, at least one of overlapping use possibility on the frequency channel, priority of assigning the frequency channel, the allowable amount of interference on the frequency channel, and frequency bandwidth used on the frequency channel is managed as the system characteristics information.

12. A frequency channel assignment method for assigning frequency channels to be used for radio communication between mobile stations and base stations in a plurality of radio communications systems which use a common frequency band in a common geographical area, the method comprising:
collecting, at a controller, channel status information showing status of frequency channels at each of the base stations, the channel status information including, for each frequency channel, an interference measurement of the frequency channel;
calculating, at the controller, the number of frequency channels required at each of the base stations, based on the collected channel status information;
assigning, at the controller, frequency channels to each of the radio communications systems, based on system characteristics information showing characteristics of frequency channels in the radio communications systems, the channel status information, and the required number of frequency channels, the system characteristics information including, for each frequency channel, an allowable amount of interference on the frequency channel;
notifying, at the controller, the assigned frequency channels to the base stations;
performing, at the base stations, radio communication with the mobile stations, using the frequency channels notified from the controller;
the assigning including determining, within a range of the common frequency band and based on the system characteristics information and the channel status information:
a first occupied use frequency band which includes first frequency channels available only to a first radio communications system,
a second occupied use frequency band which includes second frequency channels available only to a second radio communications system, and an overlapping use frequency band which includes third frequency channels available to the first and second radio communications systems; and the assigning including, when the first occupied use frequency band is lower than the second occupied use frequency band, prioritizing a frequency channel of a low frequency band in the first radio communication system and prioritizing a frequency channel of a high frequency band in the second radio communication system.

13. A control method at base stations for performing radio communication with mobile stations, using frequency channels in a common frequency band in a common geographical area, in radio communications systems, the method comprising:

collecting, at the base stations, channel status information showing status of frequency channels at the base stations, the channel status information including, for each frequency channel, an interference measurement of the frequency channel;

managing, at the base stations, system characteristics information showing characteristics of frequency channels in the radio communications systems, the system characteristics information including, for each frequency channel, an allowable amount of interference on the frequency channel;

calculating, at the base stations, the numbers of frequency channels required at the base stations, based on at least one of call loss probability and traffic at the base stations;

selecting, at the base stations, frequency channels for use between the base stations or the other base stations and the mobile stations, based on the system characteristics information, the channel status information and the required numbers of frequency channels;

the selecting including determining, within a range of the common frequency band and based on the system characteristics information and the channel status information:

a first occupied use frequency band which includes first frequency channels available only to a first radio communications system, a second occupied use frequency band which includes second frequency channels available only to a second radio communications system, and an overlapping use frequency band which includes third frequency channels available to the first and second radio communications systems; and the selecting including, when the first occupied use frequency band is lower than the second occupied use frequency band, prioritizing a frequency channel of a low frequency band in the first radio communication system and prioritizing a frequency channel of a high frequency band in the second radio communication system.

14. A control method at a control station for controlling a plurality of base stations in radio communications systems using a common frequency band in a common geographic area, the method comprising:

collecting, at the control station, channel status information showing status of frequency channels at the base stations, the channel status information including, for each frequency channel, an interference measurement of the frequency channel;

calculating, at the control station, the numbers of frequency channels required at the base stations, based on at least one of call loss probability and traffic at the base stations;

selecting, at the control station, frequency channels for use between the base stations and mobile stations, based on the system characteristics information, the channel status information, and the required numbers of frequency channels, the system characteristics information including, for each frequency channel, an allowable amount of interference on the frequency channel;

the selecting including determining, within a range of the common frequency band and based on the system characteristics information and the channel status information:

a first occupied use frequency band which includes first frequency channels available only to a first radio communications system, a second occupied use frequency band which includes second frequency channels available only to a second radio communications system, and an overlapping use frequency band which includes third frequency channels available to the first and second radio communications systems; and the selecting including, when the first occupied use frequency band is lower than the second occupied use frequency band, prioritizing a frequency channel of a low frequency band in the first radio communication system and prioritizing a frequency channel of a high frequency band in the second radio communication system.

15. The system according to claim 1, wherein
the controller assigns the first frequency channels included in the first occupied use frequency band or the third frequency channels included in the overlapping use frequency band to mobile stations included in the first radio communications system, and the controller assigns the second frequency channels included in the second occupied use frequency band or the third frequency channels included in the overlapping use frequency band to mobile stations included in the second radio communications system.

16. The system according to claim 1, wherein
the controller searches as to whether there is a first unused frequency channel in the first occupied use frequency band when a mobile station performs call processing, the controller assigns the first unused frequency channel to the mobile station when the first unused frequency channel exists in the first occupied use frequency band, the controller searches as to whether there is a third unused frequency channel in the overlapping use frequency band when the first unused frequency channel does not exist in the first occupied use frequency band, and the controller assigns the third unused frequency channel to the mobile station when the third unused frequency channel exists in the overlapping use frequency band.

17. The base station according to claim 7, wherein
the base station assigns the first frequency channels included in the first occupied use frequency band or the third frequency channels included in the overlapping use frequency band to mobile stations included in the first radio communications system, and the base station assigns the second frequency channels included in the second occupied use frequency band or the third frequency channels included in the overlapping use frequency band to mobile stations included in the second radio communications system.

18. The base station according to claim 7, wherein
the base station searches as to whether there is a first unused frequency channel in the first occupied use frequency band when a mobile station performs call processing, the base station assigns the first unused frequency channel to the mobile station when the first unused frequency channel exists in the first occupied use frequency band, the base station searches as to whether there is a third unused frequency channel in the overlapping use frequency band when the first unused frequency channel does not exist in the first occupied use frequency band, and the base station assigns the third unused frequency channel to the mobile station when the third unused frequency channel exists in the overlapping use frequency band.

19. The control station according to claim 9, wherein the control station assigns the first frequency channels included in the first occupied use frequency band or the third frequency channels included in the overlapping use frequency band to mobile stations included in the first radio communications system, and the control station assigns the second frequency channels included in the second occupied use frequency band or the third frequency channels included in the overlapping use frequency band to mobile stations included in the second radio communications system.

20. The control station according to claim 9, wherein the base station searches as to whether there is a first unused frequency channel in the first occupied use frequency band when a mobile station performs call processing, the control station assigns the first unused frequency channel to the mobile station when the first unused frequency channel exists in the first occupied use frequency band, the control station searches as to whether there is a third unused frequency channel in the overlapping use frequency band when the first unused frequency channel does not exist in the first occupied use frequency band, and the control station assigns the third unused frequency channel to the mobile station when the third unused frequency channel exists in the overlapping use frequency band.

21. The inter-system common control apparatus according to claim 10, wherein the inter-system common control apparatus assigns the first frequency channels included in the first occupied use frequency band or the third frequency channels included in the overlapping use frequency band to mobile stations included in the first radio communications system, and the inter-system common control apparatus assigns the second frequency channels included in the second occupied use frequency band or the third frequency channels included in the overlapping use frequency band to mobile stations included in the second radio communications system.

22. The inter-system common control apparatus according to claim 10, wherein the inter-system common control apparatus searches as to whether there is a first unused frequency channel in the first occupied use frequency band when a mobile station performs call processing, the inter-system common control apparatus assigns the first unused frequency channel to the mobile station when the first unused frequency channel exists in the first occupied use frequency band, the inter-system common control apparatus searches as to whether there is a third unused frequency channel in the overlapping use frequency band when the first unused frequency channel does not exist in the first occupied use frequency band, and the inter-system common control apparatus assigns the third unused frequency channel to the mobile station when the third unused frequency channel exists in the overlapping use frequency band.

23. The method according to claim 12, further comprising:

assigning the first frequency channels included in the first occupied use frequency band or the third frequency channels included in the overlapping use frequency band to mobile stations included in the first radio communications system, and assigning the second frequency channels included in the second occupied use frequency band or the third frequency channels included in the overlapping use frequency band to mobile stations included in the second radio communications system.

24. The method according to claim 12, further comprising:

searching as to whether there is a first unused frequency channel in the first occupied use frequency band when a mobile station performs call processing, assigning the first unused frequency channel to the mobile station when the first unused frequency channel exists in the first occupied use frequency band, searching to determine whether there is a third unused frequency channel in the overlapping use frequency band when the first unused frequency channel does not exist in the first occupied use frequency band, and assigning the third unused frequency channel to the mobile station when the third unused frequency channel exists in the overlapping use frequency band.

25. The method according to claim 13, further comprising:

assigning the first frequency channels included in the first occupied use frequency band or the third frequency channels included in the overlapping use frequency band to mobile stations included in the first radio communications system, and assigning the second frequency channels included in the second occupied use frequency band or the third frequency channels included in the overlapping use frequency band to mobile stations included in the second radio communications system.

26. The method according to claim 13, further comprising:

searching as to whether there is a first unused frequency channel in the first occupied use frequency band when a mobile station performs call processing, assigning the first unused frequency channel to the mobile station when the first unused frequency channel exists in the first occupied use frequency band, searching to determine whether there is a third unused frequency channel in the overlapping use frequency band when the first unused frequency channel does not exist in the first occupied use frequency band, and assigning the third unused frequency channel to the mobile station when the third unused frequency channel exists in the overlapping use frequency band.

27. The method according to claim 14, further comprising:

assigning the first frequency channels included in the first occupied use frequency band or the third frequency channels included in the overlapping use frequency band to mobile stations included in the first radio communications system, and assigning the second frequency channels included in the second occupied use frequency band or the third frequency channels included in the overlapping use frequency band to mobile stations included in the second radio communications system.

28. The method according to claim 14, further comprising:
searching as to whether there is a first unused frequency channel in the first occupied use frequency band when a mobile station performs call processing, assigning the first unused frequency channel to the mobile station when the first unused frequency channel exists in the first occupied use frequency band, searching to determine whether there is a third unused frequency channel in the overlapping use frequency band when the first unused frequency channel does not exist in the first occupied use frequency band, and assigning the third unused frequency channel to the mobile station when the third unused frequency channel exists in the overlapping use frequency band.

* * * * *